(12) United States Patent
Parks

(10) Patent No.: US 11,753,516 B2
(45) Date of Patent: Sep. 12, 2023

(54) HFO-CONTAINING COMPOSITIONS AND METHODS OF PRODUCING FOAMS

(71) Applicant: Covestro LLC, Pittsburgh, PA (US)

(72) Inventor: Brandon W. Parks, McKees Rocks, PA (US)

(73) Assignee: Covestro LLC, Pittsburgh, PA (US)

( * ) Notice: Subject to any disclaimer, the term of this patent is extended or adjusted under 35 U.S.C. 154(b) by 153 days.

(21) Appl. No.: 17/496,940

(22) Filed: Oct. 8, 2021

(65) Prior Publication Data

US 2023/0115571 A1    Apr. 13, 2023

(51) Int. Cl.
*C08J 9/14* (2006.01)
*C08G 18/50* (2006.01)

(52) U.S. Cl.
CPC .......... *C08J 9/146* (2013.01); *C08G 18/5021* (2013.01); *C08J 2203/164* (2013.01); *C08J 2375/04* (2013.01)

(58) Field of Classification Search
CPC .. C08J 9/146; C08J 2203/164; C08J 2375/04; C08G 18/283; C08G 18/4018; C08G 18/4208; C08G 18/4816; C08G 18/482; C08G 18/4829; C08G 18/4841; C08G 18/5021; C08G 18/7664; C08G 2110/0025
See application file for complete search history.

(56) References Cited

U.S. PATENT DOCUMENTS

| | | | |
|---|---|---|---|
| 5,648,019 A | 7/1997 | White, III et al. | |
| 6,617,419 B1 | 9/2003 | Hofmann et al. | |
| 7,534,366 B2 | 5/2009 | Singh et al. | |
| 7,700,004 B2 | 4/2010 | Nappa et al. | |
| 7,718,089 B2 | 5/2010 | Nappa et al. | |
| 8,008,244 B2 | 8/2011 | Knopeck et al. | |
| 8,067,345 B2 | 11/2011 | Tokiai et al. | |
| 8,420,706 B2 | 4/2013 | Bowman et al. | |
| 8,558,040 B2 | 10/2013 | Creazzo et al. | |
| 8,633,339 B2 | 1/2014 | Creazzo et al. | |
| 8,729,145 B2 | 5/2014 | Bowman et al. | |
| 9,303,162 B2 | 4/2016 | Bowman et al. | |
| 9,410,024 B2 | 8/2016 | Hulse et al. | |
| 9,592,413 B2 | 3/2017 | Hulse et al. | |
| 9,896,558 B2 | 2/2018 | Giesker et al. | |
| 10,011,698 B2 | 7/2018 | Bowman et al. | |
| 10,023,679 B2 | 7/2018 | Klostermann et al. | |
| 10,125,235 B2 * | 11/2018 | Riccio .................... | C08G 18/18 |
| 10,336,879 B2 | 7/2019 | Kurita et al. | |
| 10,344,136 B2 | 7/2019 | Bogdan et al. | |
| 10,640,600 B2 | 5/2020 | Rider et al. | |
| 10,752,725 B2 | 8/2020 | Rider et al. | |
| 10,894,869 B2 | 1/2021 | Nandi et al. | |
| 10,913,235 B2 | 2/2021 | Nandi et al. | |
| 10,934,409 B2 | 3/2021 | Han et al. | |
| 10,988,593 B2 | 4/2021 | Schuette et al. | |
| 2008/0060385 A1 | 3/2008 | Serrano et al. | |
| 2009/0204447 A1 | 8/2009 | Tucker et al. | |
| 2009/0253820 A1 | 10/2009 | Bowman et al. | |
| 2009/0305876 A1 | 12/2009 | Singh et al. | |
| 2009/0325445 A1 | 12/2009 | Bogdan et al. | |
| 2010/0172701 A1 | 7/2010 | Tucker et al. | |
| 2010/0210747 A1 | 8/2010 | Loh et al. | |
| 2011/0111425 A1 | 5/2011 | Rylatt et al. | |
| 2012/0043492 A1 | 2/2012 | Williams et al. | |
| 2012/0046372 A1 | 2/2012 | Bogdan et al. | |
| 2014/0275308 A1 | 9/2014 | Annan et al. | |
| 2015/0057384 A1 | 2/2015 | Glos et al. | |
| 2016/0296780 A1 | 10/2016 | Singh et al. | |
| 2017/0066867 A1 | 3/2017 | Ross et al. | |
| 2017/0158833 A1 | 6/2017 | Williams et al. | |
| 2017/0210869 A1 * | 7/2017 | Wysong ................ | C08G 18/42 |
| 2018/0016379 A1 | 1/2018 | Williams et al. | |
| 2018/0134861 A1 | 5/2018 | Schilling | |
| 2019/0100639 A1 | 4/2019 | Wysong | |
| 2019/0112443 A1 | 4/2019 | Bowman et al. | |
| 2019/0211962 A1 | 7/2019 | Kress et al. | |
| 2019/0233571 A1 | 8/2019 | Diendorf et al. | |
| 2019/0284363 A1 | 9/2019 | Albers et al. | |
| 2019/0367770 A1 | 12/2019 | Bruning et al. | |
| 2020/0080767 A1 | 3/2020 | Schornstein et al. | |
| 2020/0094516 A1 | 3/2020 | Ottens et al. | |
| 2020/0157304 A1 | 5/2020 | Bogdan et al. | |
| 2020/0173165 A1 | 6/2020 | Nandi et al. | |
| 2020/0283563 A1 | 9/2020 | Parks et al. | |
| 2020/0291281 A1 | 9/2020 | Singh et al. | |
| 2020/0299453 A1 * | 9/2020 | Saad ................ | C08G 18/7671 |
| 2020/0392276 A1 | 12/2020 | Nefzger et al. | |
| 2020/0392277 A1 | 12/2020 | Nefzger et al. | |
| 2021/0061939 A1 | 3/2021 | Feng et al. | |
| 2021/0070917 A1 | 3/2021 | Singh et al. | |
| 2021/0115212 A1 | 4/2021 | Albach et al. | |
| 2021/0163662 A1 | 6/2021 | Koester et al. | |
| 2021/0163663 A1 | 6/2021 | Welsch et al. | |
| 2021/0238337 A1 | 8/2021 | Joncheray et al. | |
| 2021/0309823 A1 | 10/2021 | Albach et al. | |

FOREIGN PATENT DOCUMENTS

| | | |
|---|---|---|
| AU | 2013204160 A1 | 5/2013 |
| AU | 2012265607 B2 | 1/2015 |
| AU | 2018275033 B2 | 2/2020 |
| CA | 2730917 A1 | 1/2010 |
| CA | 2646990 C | 2/2018 |

(Continued)

*Primary Examiner* — John M Cooney
(74) *Attorney, Agent, or Firm* — Donald R. Palladino

(57) ABSTRACT

Polyurethane foam-forming compositions, methods of producing polyurethane foams, polyurethane foams produced from such compositions made by such methods, as well as isocyanate-reactive compositions. The polyurethane foam-forming compositions include a polyisocyanate; a polyol blend, and a physical blowing agent composition. The polyol blend includes an aromatic amine-initiated polyether polyol having an OH number of at least 200 mg KOH/g and a functionality of at least 3, wherein (i) the aromatic amine-initiated polyether polyol having an OH number of at least 200 mg KOH/g is present in amount of at least 20% by weight, based on the total weight of polyol, and (ii) the polyol blend has a content of —$C_2H_4O$— units of 2 to 7% by weight, based on total weight of the polyurethane foam-forming composition. The physical blowing agent composition includes cis-1,1,1,4,4,4-hexafluoro-2-butene and trans-1,1,1,4,4,4-hexafluoro-2-butene.

22 Claims, 1 Drawing Sheet

(56) References Cited

FOREIGN PATENT DOCUMENTS

| | | | |
|---|---|---|---|
| CA | 2612986 C | 6/2020 | |
| CA | 2613090 C | 8/2020 | |
| CA | 2901417 C | 8/2021 | |
| CN | 101527026 A | 9/2009 | |
| CN | 101546415 A | 9/2009 | |
| CN | 104788642 A | 7/2015 | |
| CN | 106750093 A | 5/2017 | |
| CN | 107163221 A | 9/2017 | |
| CN | 107522835 A | 12/2017 | |
| CN | 107955122 A | 4/2018 | |
| CN | 105601978 B | 5/2018 | |
| CN | 108129631 A | 6/2018 | |
| CN | 108192065 A | 6/2018 | |
| CN | 108586792 A | 9/2018 | |
| CN | 111320737 A | 6/2020 | |
| EP | 2666809 A2 | 11/2013 | |
| EP | 3670563 A1 | 6/2020 | |
| EP | 3819332 A1 | 5/2021 | |
| ES | 2761816 T3 | 5/2020 | |
| JP | 2014062214 A | 4/2014 | |
| JP | 2015050139 A | 3/2015 | |
| JP | 2015105341 A | 6/2015 | |
| JP | 2015105343 A | 6/2015 | |
| JP | 2016124912 A | 7/2016 | |
| JP | 2018119034 A | 8/2018 | |
| JP | 2019203053 A | 11/2019 | |
| JP | 2019218425 A | 12/2019 | |
| JP | 6775092 B2 | 10/2020 | |
| JP | 2021032339 A | 3/2021 | |
| KR | 2154519 B1 | 9/2020 | |
| KR | 20210001039 A | 1/2021 | |
| WO | 2007002703 A2 | 1/2007 | |
| WO | 2012105657 A1 | 8/2012 | |
| WO | 2019011761 A1 | 1/2019 | |
| WO | 2019211200 A1 | 11/2019 | |
| WO | 2019238442 A1 | 12/2019 | |
| WO | 2020055559 A1 | 3/2020 | |
| WO | 2020099992 A1 | 5/2020 | |
| WO | 2020146442 A1 | 7/2020 | |
| WO | 2021008921 A1 | 1/2021 | |
| WO | 2021045887 A1 | 3/2021 | |
| WO | 2021089392 A1 | 5/2021 | |
| WO | 2021122177 A1 | 6/2021 | |
| WO | WO-2021122177 A1 * | 6/2021 | ............ B29B 7/007 |

* cited by examiner

HFO-CONTAINING COMPOSITIONS AND METHODS OF PRODUCING FOAMS

FIELD

This specification pertains generally to hydrofluoroolefin ("HFO")-containing isocyanate-reactive compositions, polyurethane foam-forming compositions, and polyurethane foams produced therefrom. The compositions include a physical blowing agent composition comprising cis-1,1,1,4,4,4-hexafluoro-2-butene and trans-1,1,1,4,4,4-hexafluoro-2-butene.

BACKGROUND

Rigid polyurethane foams are used in numerous applications. They are produced by reacting an appropriate polyisocyanate and an isocyanate-reactive compound, usually a polyol, in the presence of a blowing agent. One use of such foams is as a thermal insulation medium in the construction of refrigerated storage devices, including refrigerated appliances and tractor trailers. The thermal insulating properties of closed-cell rigid foams are dependent upon a number of factors, including the average cell size and the thermal conductivity of the contents of the cells.

The thermal conductivity of the contents of the cells depends upon the blowing agent(s) used. Fluorocarbons have historically often been used because of their low thermal conductivity. However, fluorocarbons, including chlorofluorocarbons ("CFCs"), hydrofluorocarbons ("HFCs") and hydrochlorofluorocarbons ("HCFCs"), are greenhouse gases that have been phased out of use. Halogenated olefins, such as hydrofluoroolefins ("HFO") and hydrochlorofluoroolefins ("HCFOs"), are environmentally-friendlier alternatives for such fluorocarbons, but they can be costly. In addition, certain HCFO's may react with certain catalysts often used in the reaction mixture, resulting in poor foam quality and changes in reactivity as the material ages. As a result, it is desirable to provide an alternative to such HCFOs. Use of other HFOs, such as the cis- and trans-isomers of 1,1,1,4,4,4-hexafluoro-2-butene, offer a potential alternative that solves this issue.

Thermal efficiency, often evaluated with respect to a low thermal conductivity, or "K-factor", is a critically important feature of rigid polyurethane foam insulation. Even seemingly small reductions in K-factor, such as on the order of just a few percent, can translate into very significant reductions in energy usage and cost over the lifetime of the device in which the foam is used. For example, according to some estimates, a 2% decrease in K-factor can result in approximately a 1% improvement in energy performance for a refrigerator, which can allow for using a smaller compressor, thus providing potential energy and cost savings over the life of the refrigerator. Alternatively, the thickness of the refrigerator wall or door could be reduced while achieving similar insulation properties, thus allowing for increased internal storage space.

As a result, efforts are continuously made to reduce the thermal conductivity of rigid polyurethane foam insulation. Reducing the thermal conductivity of the foam cannot, however, come at the price of significantly deteriorating other important properties, including physical properties of the foam (such as dimensional stability or compressive strength) or processing characteristics (such as flow, reactivity and de-mold characteristics).

Therefore, HFO-blown rigid polyurethane foams that have improved thermal conductivity, while at the same time exhibiting favorable physical properties and favorable processing characteristics, would be highly desirable.

SUMMARY

In certain respects, this specification relates to polyurethane foam-forming compositions. These polyurethane foam-forming compositions comprise a polyisocyanate; a polyol blend; and a physical blowing agent composition. The polyol blend comprises an aromatic amine-initiated polyether polyol having an OH number of at least 200 mg KOH/g and a functionality of at least 3, such aromatic amine-initiated polyether polyol being present in amount of at least 20% by weight, based on the total weight of polyol, and the polyol blend has a content of —$C_2H_4O$— units of 2 to 7% by weight, based on total weight of the polyurethane foam-forming composition. The physical blowing agent composition comprises cis-1,1,1,4,4,4-hexafluoro-2-butene and trans-1,1,1,4,4,4-hexafluoro-2-butene.

In other respects, this specification relates to methods of producing a polyurethane foam, comprising reacting a polyol blend with a polyisocyanate at an isocyanate index of 0.70 to 1.50 in the presence of components comprising a physical blowing agent composition. In these methods: (1) the polyol blend comprises an aromatic amine-initiated polyether polyol having an OH number of at least 200 mg KOH/g and a functionality of at least 3, such aromatic amine-initiated polyether polyol being present in amount of at least 20% by weight, based on the total weight of polyol, and the polyol blend has a content of —$C_2H_4O$— units of 2 to 7% by weight, based on total weight of polyol; and (2) the blowing agent composition comprises cis-1,1,1,4,4,4-hexafluoro-2-butene and trans-1,1,1,4,4,4-hexafluoro-2-butene.

In yet other respects, this specification relates to isocyanate-reactive compositions. These isocyanate-reactive compositions comprise a polyol blend and a physical blowing agent compositions. The polyol blend comprises an aromatic amine-initiated polyether polyol having an OH number of at least 200 mg KOH/g and a functionality of at least 3, with such aromatic amine-initiated polyether polyol being present in amount of at least 20% by weight, based on the total weight of polyol, and the polyol blend has a content of —$C_2H_4O$— units 4 to 15% by weight, based on total weight of polyol in the isocyanate-reactive composition. The physical blowing agent composition comprises cis-1,1,1,4,4,4-hexafluoro-2-butene and trans-1,1,1,4,4,4-hexafluoro-2-butene.

This specification is also directed to rigid polyurethane foams produced from such foam-forming compositions and by such methods, as well as to composite articles comprising such rigid foams and panel insulation that includes such rigid foams.

DETAILED DESCRIPTION

Figure 1:
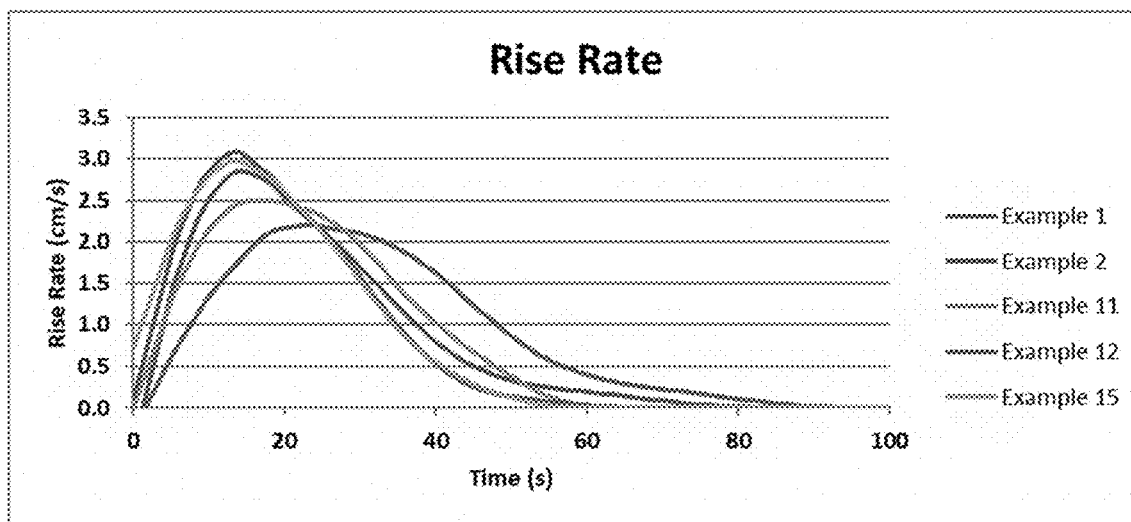
FIGS. 1 and 2 are graphs of the rise rate pressure profiles of some of the Example foams.

Various implementations are described and illustrated in this specification to provide an overall understanding of the structure, function, properties, and use of the disclosed inventions. It is understood that the various implementations described and illustrated in this specification are non-limiting and non-exhaustive. Thus, the invention is not limited by the description of the various non-limiting and non-exhaustive implementations disclosed in this specification. The features and characteristics described in connection with various implementations may be combined with the features and characteristics of other implementations. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various implementations disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described implementations. Further, the use of a singular noun includes the plural, and the use of a plural noun includes the singular, unless the context of the usage requires otherwise.

As used herein, the term "functionality" refers to the average number of reactive hydroxyl groups, —OH, present per molecule of the —OH functional material that is being described. In the production of polyurethane foams, the hydroxyl groups react with isocyanate groups, —NCO, that are attached to the isocyanate compound. The term "hydroxyl number" refers to the number of reactive hydroxyl groups available for reaction, and is expressed as the number of milligrams of potassium hydroxide equivalent to the hydroxyl content of one gram of the polyol (ASTM D4274-16). The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol—Equivalent Weight (g/eq)=(56.1×1000)/OH number.

The polyol blends of this specification have a content of —$C_2H_4O$— units within a specified range. As used in this context, "a content of —$C_2H_4O$— units" refers to the calculated weight of —$C_2H_4O$— units present in a polyol that are formed during production of the polyol itself (as opposed to —$C_2H_4O$— units that may already be present in a reactant used to prepare the polyol). In the case of a polyether polyol that is an alkoxylation reaction product of an H-functional starter and an alkylene oxide, for example, —$C_2H_4O$— units can result from use of ethylene oxide as an alkylene oxide and/or use of an H-functional starter containing a —$C_2H_4Z$— group in which Z represents a Zerewitinoff-active hydrogen atom (sometimes also referred to merely as "active hydrogen"), such as can be the case where Z represents a hydrogen bonded to N, O or S. In the case of a polyester polyol that is a reaction product of a carboxylic acid and/or anhydride thereof with a hydroxyl-containing material, —$C_2H_4O$— units may result, for example, from use of diethylene glycol as a hydroxyl-containing material. Thus, when it is stated herein that a polyol blend has a content of —$C_2H_4O$— units of 2 to 7% by weight, based on total weight of the polyurethane foam-forming composition, it means that 2 to 7% by weight of the polyurethane foam-forming composition, based on the total weight of the polyurethane foam-forming composition, is —$C_2H_4O$— units formed during production of the polyol(s) that are used, as calculated based on the weight of materials used to make the polyols.

As indicated, certain implementations of the present specification relate to isocyanate-reactive compositions useful in the production of rigid foams. A rigid foam is characterized as having a ratio of compressive strength to tensile strength of at least 0.5:1, elongation of less than 10%, as well as a low recovery rate from distortion and a low elastic limit, as described in in "Polyurethanes: Chemistry and Technology, Part II Technology," J. H. Saunders & K. C. Frisch, Interscience Publishers, 1964, page 239.

The rigid foams of this specification are the reaction product of a polyurethane-foam forming composition that includes a polyisocyanate. As used herein, the term "polyisocyanate" encompasses diisocyanates, as well as isocyanates of greater functionality than 2.0.

Any of the known organic isocyanates, modified isocyanates or isocyanate-terminated prepolymers made from any of the known organic isocyanates may be used. Suitable organic isocyanates include aromatic, aliphatic, and cycloaliphatic polyisocyanates and combinations thereof. Useful isocyanates include: diisocyanates such as m-phenylene diisocyanate, p-phenylene diisocyanate, 2,4-toluene diisocyanate, 2,6-toluene diisocyanate, 1,6-hexamethylene diisocyanate, 1,4-hexamethylene diisocyanate, 1,3-cyclohexane diisocyanate, 1,4-cyclo-hexane diisocyanate, isomers of hexahydro-toluene diisocyanate, isophorone diisocyanate, dicyclo-hexylmethane diisocyanates, 1,5-naphthylene diisocyanate, 4,4'-diphenylmethane diisocyanate, 2,4'-diphenylmethane diisocyanate, 4,4'-biphenylene diisocyanate, 3,3'-dimethoxy-4,4'-biphenylene diisocyanate and 3,3'-dimethyldiphenyl-propane-4,4'-diisocyanate; triisocyanates such as 2,4,6-toluene triisocyanate; and polyisocyanates such as 4,4'-dimethyl-diphenylmethane-2,2',5,5'-tetraisocyanate and the polymethylene polyphenyl-polyisocyanates.

Undistilled or crude polyisocyanates may also be used. The crude toluene diisocyanate obtained by phosgenating a mixture of toluene diamines and the crude diphenylmethane diisocyanate obtained by phosgenating crude diphenylmethanediamine (polymeric MDI) are examples of suitable crude polyisocyanates. Suitable undistilled or crude polyisocyanates are disclosed in U.S. Pat. No. 3,215,652.

Modified isocyanates are obtained by chemical reaction of diisocyanates and/or polyisocyanates. Useful modified isocyanates include, but are not limited to, those containing ester groups, urea groups, biuret groups, allophanate groups, carbodiimide groups, isocyanurate groups, uretdione groups and/or urethane groups. Examples of modified isocyanates include prepolymers containing NCO groups and having an NCO content of from 25 to 35 weight percent, such as from 29 to 34 weight percent, such as those based on polyether polyols or polyester polyols and diphenylmethane diisocyanate.

In certain implementations, the polyisocyanate comprises a methylene-bridged polyphenyl polyisocyanate and/or a prepolymer of methylene-bridged polyphenyl polyisocyanates having an average functionality of from 1.8 to 3.5, such as from 2.0 to 3.1, isocyanate moieties per molecule and an NCO content of from 25 to 32 weight percent, due to their ability to cross-link the polyurethane.

The isocyanate-reactive compositions described in this specification comprise a polyol blend. More specifically, the polyol blend comprises an aromatic amine-initiated polyether polyol. As used herein, "aromatic amine-initiated polyether polyol" refers to a polyether polyol that is the reaction product of an H-functional starter comprising an aromatic amine, such as, toluenediamine ("TDA"), with alkylene oxide.

In certain implementations, aromatic amine employed has an amine functionality of at least 1, such as 1 to 3 or 1 to 2. Specific examples of suitable aromatic amines which can be used include crude TDA obtained by the nitration of toluene followed by reduction; 2,3-TDA, 3,4-TDA, 2,4-TDA, 2,6-TDA or mixtures thereof; aniline; 4,4'-methylene dianiline; methylene-bridged polyphenyl polyamines composed of isomers of methylene dianilines and triamines or polyamines of higher molecular weight prepared by reacting aniline with formaldehyde by methods known in the art. In some implementations, a mixture composed of 2,3-TDA and 3,4-TDA (commonly referred to as "o-TDA") is used.

In addition to the aromatic amine, other H-functional starters may also be used to prepare the aromatic amine-initiated polyether polyol. These other H-functional starters include, for example, water, propylene glycol, glycerin, ethylene glycol, ethanol amines, diethylene glycol, or a mixture of any two or more thereof. As will be appreciated, it is possible to use a wide variety of individual starters in combination with one another. In some implementations, however, aromatic amine is the predominant or essentially sole H-functional starter used to produce the aromatic amine-initiated polyether polyol. This means that, in these implementations, aromatic amine is present in an amount of more than 50% by weight, such as at least 80% by weight, at least 90% by weight, or even 100% by weight, based on the total weight of H-functional starter used to produce the aromatic amine-initiated polyether polyol.

Any of a variety of alkylene oxides may be used to produce the aromatic amine-initiated polyether polyol, such as, for example, ethylene oxide, propylene oxide, butylene oxide, amylene oxide and mixtures thereof. The alkylene oxides may be added individually, sequentially one after the other to form blocks or in a mixture to form a heteric polyether. The aromatic amine-initiated polyether polyols may have either primary or secondary hydroxyl end groups. In some implementations, propylene oxide is the primary or essentially sole alkylene oxide used to prepare the aromatic amine-initiated polyether polyols. This means that, in these implementations, propylene oxide is used in an amount of more than 50% by weight, such as at least 80% by weight, at least 90% by weight, or even 100% by weight, based on the total weight of alkylene oxide used to prepare the aromatic amine-initiated polyether polyol. In some implementations, ethylene oxide is employed in a relatively small amount. Thus, in these implementations, ethylene oxide is present in an amount of no more than 10% by weight, such as no more than 5% by weight, no more than 1% by weight, or, in some cases, 0% by weight, based on the total weight of alkylene oxide used to prepare the aromatic amine-initiated polyether polyol.

As indicated earlier, the aromatic amine-initiated polyether polyol has an OH number of at least 200 mg KOH/g and a functionality of at least 3. In some implementations, the aromatic amine-initiated polyether polyol has an OH number of 200 to 405 mg KOH/g, such as 380 to 420 mg KOH/g and an average functionality of 3.5 to 4.5, 3.8 to 4.2 or 4.0.

The foregoing aromatic amine-initiated polyether polyol is present in the polyol blend in an amount of at least 20% by weight, based on the total weight of polyol. More specifically, in some implementations, the foregoing aromatic amine-initiated polyol is present in an amount of 20 to 80% by weight, such as 30 to 70% by weight, or, in some cases, 40 to 60% by weight or 40 to 50% by weight, based on the total weight of polyol in the polyol blend.

The polyol blend includes other polyols. For example, in some implementations, the polyol blend comprises a saccharide-initiated polyether polyol. As used herein, "saccharide-initiated polyether polyol" refers to a polyether polyol that is the reaction product of an H-functional starter comprising saccharide, such as sucrose, with alkylene oxide. Examples of suitable alkylene oxides include ethylene oxide, propylene oxide, butylene oxide, styrene oxide, epichlorohydrin, or a mixture of any two or more thereof.

Some examples of suitable saccharide initiators are sucrose, sorbitol, maltitol, etc. as well as other mono-saccharides, di-saccharides, tri-saccharides and polysaccharides. Other initiator compounds are often used in combination with the saccharide initiator to prepare the saccharide initiated polyether polyol. Saccharides can be co-initiated with for example, compounds such as water, propylene glycol, glycerin, ethylene glycol, ethanol amines, diethylene glycol, or a mixture of any two or more thereof. As will be appreciated, it is possible to use a wide variety of individual initiator compounds in combination with saccharide initiator.

In some implementations, saccharide is the predominant H-functional starter used to produce the saccharide-initiated polyether polyol. This means that, in these implementations, saccharide is present in an amount of more than 50% by weight, such as at least 70% by weight or at least 80% by weight, based on the total weight of H-functional starter used to produce the saccharide-initiated polyether polyol.

In some implementations, propylene oxide is the primary or essentially sole alkylene oxide used to prepare the saccharide-initiated polyether polyol. This means that, in these implementations, propylene oxide is used in an amount of more than 50% by weight, such as at least 80% by weight, at least 90% by weight, or even 100% by weight, based on the total weight of alkylene oxide used to prepare the saccharide-initiated polyether polyol. In some implementations, ethylene oxide is employed in a relatively small amount. Thus, in these implementations, ethylene oxide is present in an amount of no more than 10% by weight, such as no more than 5% by weight, no more than 1% by weight, or, in some cases, 0% by weight, based on the total weight of alkylene oxide used to prepare that saccharide-initiated polyether polyol.

In some implementations, the saccharide-initiated polyether polyol has an OH number of from 200 to 600 mg KOH/g, such as 300 to 550 mg KOH/g, such as 380 to 500 mg KOH/g, or, in some cases, 450 to 500 mg KOH/g, and a functionality of 4 to 6, such as 5 to 6, 5.2 to 5.8, or 5.2 to 5.6.

In some implementations, saccharide-initiated polyether polyol is present in the polyol blend in an amount of at least 10% by weight, based on the total weight of polyol. More specifically, in some implementations, the foregoing aromatic amine-initiated polyol is present in an amount of 10 to 50% by weight, such as 10 to 40% by weight, or, in some cases, 20 to 40% by weight, based on the total weight of polyol in the polyol blend.

In some implementations, the polyol blend comprises an aromatic polyester polyol. Suitable aromatic polyester polyols include, for example, the reaction product of an aromatic diacid or anhydride with a suitable glycol or triol. For example, polyester polyols can be the reaction product of a glycol and/or triol, such as ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane, or a mixture of any two or more thereof with an aromatic diacid or aromatic anhydride, such as, for example, phthalic acid, isophthalic acid, terephthalic acid, phthalic anhydride, or a mixture of any two or more thereof. Some of examples of the suitable aromatic polyester polyols include those compounds which are available from Stepan Chemical under the Stepanpol trade name such as, for example, Stepanpol® PS 3024 and Stepanpol PS 2502A or from Invista under the Terate trade name, such as Terate® HT-5100 and HT-5500, or from Coim under the Isoexter trade name such as Isoexter® TB-265.

In certain implementations, the aromatic polyester polyol has an OH number of 150 to 410 mg KOH/g, such as 150 to 360 mg KOH/g, such as 200 to 335 mg KOH/g, or, in some cases, 200 to 250 mg KOH/g, and a functionality of 1.5 to 3, such as 1.9 to 2.5.

In some implementations, the aromatic polyester polyol is utilized in an amount of 5 to 40%, such as 5 to 30%, or 10 to 30% by weight, based upon the total weight of the polyol blend.

In certain implementations, the aromatic amine-initiated polyether polyol and the saccharide-initiated polyether polyol are present in the polyol blend is a weight ratio of at least 0.8:1, such as 1:1 to 5:1 or, in some cases, 1:1 to 2:1. In certain implementations, the aromatic amine-initiated polyether polyol and the aromatic polyester polyol are present in the polyol blend in a weight ratio of at least 1:1, such as 1:1 to 5:1, or 1.5:1 to 2.5:1. In certain implementations, the saccharide-initiated polyether polyol and the aromatic polyester polyol are present in the polyol blend in a weight ratio of at least 1:1, such as 1:1 to 5:1, or 1:1 to 1.5:1.

If desired, the polyol blend may include additional compounds that contain isocyanate-reactive groups, such as chain extenders and/or crosslinking agents, and higher molecular weight polyether polyols and polyester polyols not described above. Chain extenders and/or crosslinking agents include, for example, ethylene glycol, propylene glycol, butylene glycol, glycerol, diethylene glycol, dipropylene glycol, dibutylene glycol, trimethylolpropane, pentaerythritol, ethylene diamine, diethyltoluenediamine, etc. Polyester polyols may be prepared from, for example, an organic dicarboxylic acid having 2 to 12 carbon atoms, such as an aliphatic dicarboxylic acid having 4 to 6 carbon atoms, and a polyvalent alcohol, such as a diol or triol having 2 to 12 carbon atoms. Examples of the dicarboxylic acid are succinic acid, glutaric acid, adipic acid, suberic acid, azelaic acid, sebacic acid, decanedicarboxylic acid, maleic acid, fumaric acid, phthalic acid, isophthalic acid and terephthalic acid. Instead of a free dicarboxylic acid, a corresponding dicarboxylic acid derivative such as a dicarboxylic acid monoester or diester prepared by esterification with an alcohol having 1 to 4 carbon atoms or dicarboxylic anhydride can be used.

In certain implementations, the polyol blend has a weighted average functionality of from 2 to 4, such as 3 to 4 or 3.5 to 4.0, and/or a weighted average hydroxyl number of from 300 to 500 mg KOH/g, such as 300 to 400 mg KOH/g. In certain embodiments, the polyol blend is present in the polyurethane foam-forming composition in an amount of at least 50% by weight, such as 50 to 90% by weight or 60 to 80% by weight, based on the total weight of the polyurethane foam-forming composition except for the weight of the polyisocyanate.

As earlier indicated, one aspect of the inventions of this specification is that the polyol blend has a content of —$C_2H_4O$— units of 2 to 7% by weight, based on total weight of the polyurethane foam-forming composition. In some implementation, the polyol blend has a content of —$C_2H_4O$— units of 3 to 6% by weight or 4 to 6% by weight, based on total weight of the polyurethane foam-forming composition. In addition, in some implementations, polyether polyol present in the polyol blend little or no content of —$C_2H_4O$— units. Thus, in some implementations, the polyether polyol(s) in the polyol blend has a content of —$C_2H_4O$— units of no more than 5% by weight, such as no more than 2% by weight or no more than 1% by weight, based on total weight of polyol present.

As indicated, the isocyanate-reactive composition of this specification further comprises a physical blowing agent composition. The physical blowing agent composition comprises cis-1,1,1,4,4,4-hexafluoro-2-butene and trans-1,1,1,4,4,4-hexafluoro-2-butene. In some implementations, cis-1,1,1,4,4,4-hexafluoro-2-butene and trans-1,1,1,4,4,4-hexafluoro-2-butene are present in the physical blowing agent composition in a relative ratio, by weight, of greater than 1:1, such as 1.5:1 to 4:1, 1.8:1 to 3:1, or, in some cases, 2.2:1 to 2.4:1.

In some implementations, other physical blowing agents may also be used. For example, in some implementation, a HCFO may also be present. Suitable HCFOs include 1-chloro-3,3,3-trifluoropropene (HCFO-1233zd, E and/or Z isomers), 2-chloro-3,3,3-trifluoropropene (HCFO-1233xf), HCFO1223, 1,2-dichloro-1,2-difluoroethene (E and/or Z isomers), 3,3-dichloro-3-fluoropropene, 2-chloro-1,1,1,4,4,4-hexafluorobutene-2 (E and/or Z isomers), 2-chloro-1,1,1,3,4,4,4-heptafluorobutene-2 (E and/or Z isomers). In some implementations, the boiling point, at atmospheric pressure, of the HCFO is at least −25° C., at least −20° C., or, in some cases, at least −19° C., and 40° C. or less, such as 35° C. or less, or, in some cases 33° C. or less. The HCFO may have a boiling point, at atmospheric pressure, of, for example, −25° C. to 40° C., or −20° C. to 35° C., or −19° C. to 33° C.

Other physical blowing agents that might be used include CFCs, HCFCs, and/or HFCs and/or hydrocarbon blowing agents, such as butane, n-pentane, cyclopentane, hexane, and/or isopentane (i.e. 2-methylbutane). Also suitable are other HFOs, such as pentafluoropropane, tetrafluoropropene, 2,3,3,3-tetrafluoropropene, 1,2,3,3-tetrafluoropropene, trifluoropropene, tetrafluorobutene, pentafluorobutene, heptafluorobutene, heptafluoropentene, octafluoropentene, and nonafluoropentene In some implementations, however, the physical blowing agent composition comprises predominantly or, in some cases, essentially only cis-1,1,1,4,4,4-hexafluoro-2-butene and trans-1,1,1,4,4,4-hexafluoro-2-butene. As a result, in some implementations, the sum of the amount of cis-1,1,1,4,4,4-hexafluoro-2-butene and trans-1,1,1,4,4,4-hexafluoro-2-butene represents more than 50% by weight, such as at least 60% by weight, at least 70% by weight, at least 80% by weight, at least 90% by weight, at least 95% by weight, or, in some cases, at least 99% by weight, based on the total weight of the physical blowing agent composition.

In certain implementations, the physical blowing agent composition is present in an amount of at least 10% by weight, such as 10 to 30% by weight, or 20 to 30% by weight, based on the total weight of the polyurethane foam-forming composition except for the weight of the polyisocyanate.

In some implementations, a carbon dioxide generating chemical blowing agent, such as water and/or a formate-blocked amine, is also included. In some of these implementations, the carbon dioxide generating chemical blowing agent, such as water, is utilized in an amount of from 0.5 to 5.0% by weight, such as 1.5 to 4% by weight, or 1.0 to 3.0% by weight, or 2.0 to 3.0% by weight, based on the total weight of the polyurethane foam-forming composition except for the weight of the polyisocyanate.

In certain implementations, the physical blowing agent composition and the carbon dioxide generating chemical blowing agent are present in a relative ratio, by weight, of at least 5:1, such as 5:1 to 50:1, 5:1 to 30:1 or, in some cases, 10:1 to 20:1.

The polyurethane foam-forming composition also typically comprises a surfactant. Suitable surfactant include, for example, organosilicon compounds, such as polysiloxane-polyalkyene-block copolymers, such as a polyether-modified polysiloxane. Other possible surfactants include polyethylene glycol ethers of long chain alcohols, tertiary amine or alkanolamine salts of long chain alkyl acid sulfate esters, alkylsulfonic esters, or alkylarylsulfonic acids. Such surfactants are employed in amounts sufficient to stabilize the foaming reaction mixture against collapse and the formation of large and uneven cells. In some implementations, surfactant is utilized in an amount of 0.2 to 5.0% by weight, such as 1 to 3% by weight, based on the total weight of the polyurethane foam-forming composition except for the weight of the polyisocyanate.

The polyurethane foam-forming compositions of this specification also typically comprise a catalyst, such as a tertiary amine, tertiary phosphine, a metal chelate, an acid metal salt, a strong base, a metal alcoholate and/or phenolate, a metal salt of an organic acid, or a combination thereof. In some implementations, the catalyst comprises an organotin catalyst and/or tertiary amine catalyst. For example, in some cases, a combination of at least one "blowing" catalyst, which strongly promotes the reaction of an isocyanate group with a water molecule to form carbon dioxide, and either at least one "gelling" catalyst, which strongly promotes the reaction of an alcohol group with an isocyanate to form the urethane, or at least one trimerization catalyst, may be used.

Specific examples of suitable tertiary amine catalysts include: pentamethyldiethylenetriamine, N,N-dimethylcyclohexylamine, N,N',N"-tris(3-dimethylaminopropyl-)hexahydrotriazine, tetramethylethylenediamine, tetraethylene diamine, benzyldimethylamine or a combination thereof. In certain embodiments, the tertiary amine catalyst includes pentamethyldiethylenetriamine, N,N',N"-dimethylaminopropyl-hexahydrotriazine, N,N-dimethylcyclohexylamine, or a combination thereof. Specific examples of suitable organometallic catalysts include dibutyltin dilaurate, dibutyltin diacetate, stannous octoate, potassium octoate, potassium acetate, potassium 2-ethylhexanoate, or a combination thereof. In some implementations, catalyst is present in an amount of 0.01 to 3.0% by weight or 0.3 to 2.5% by weight, based on the total weight of the polyurethane foam-forming composition except for the weight of the polyisocyanate.

Additional materials which may optionally be included in the foam-forming compositions of the present invention include: pigments, colorants, fillers, antioxidants, flame retardants, and stabilizers. Exemplary flame retardants useful in the foam-forming composition of the present invention include, but are not limited to, reactive bromine based compounds known to be used in polyurethane chemistry and chlorinated phosphate esters, including but not limited to, tri(2-chloroethyl)phosphate (TECP), tri(1,3-dichloro-2-propyl)phosphate, tri(1-chloro-2-propyl)phosphate (TCPP) and dimethyl propyl phosphate (DMPP).

This specification is also directed to processes for producing rigid polyurethane foams. In such processes, a polyisocyanate is reacted with an isocyanate-reactive composition comprising the polyol blend. In some implementations, the isocyanate functional component and the polyol blend are mixed at an isocyanate index of from 0.90 to 1.50, such as 1.20 to 1.50.

The polyol blend is reacted with an polyisocyanate in the presence of the blowing agent composition, the catalyst composition, a surfactant and any other optional ingredients. The rigid foams may be prepared by blending all of the polyurethane foam-forming composition components, except for the polyisocyanate, together in a phase stable mixture, and then mixing this mixture in the proper ratio with the polyisocyanate. Alternatively, one or more of the components, such as the surfactant, may be combined with the polyisocyanate prior to mixing it with the polyol blend. Other possible implementations would include adding one or more of the components as a separate stream, together with the polyol blend and polyisocyanate. As used herein, the term phase stable means that the composition does not visibly separate when stored for 7 days at about 70° F. (or 21° C.).

Many foam machines are designed to condition and mix only two components in the proper ratio. For use of these machines, a premix of all the components except the polyisocyanate can be advantageously employed. According to the two-component method (component A: polyisocyanate; and component B: isocyanate-reactive composition which typically includes the polyol blend, blowing agent, water, catalyst and surfactant), the components may be mixed in the proper ratio at a temperature of 5 to 50° C., such as 15 to 35° C., injected or poured into a mold having the temperature controlled to within a range of from 20 to 70° C., such as 35 to 60° C. The mixture then expands to fill the cavity with the rigid polyurethane foam. This simplifies the metering and mixing of the reacting components which form the foam-forming mixture, but requires that the isocyanate reactive composition be phase stable.

Alternatively, the rigid polyurethane foams may also be prepared by the so-called "quasi prepolymer" method. In this method, a portion of the polyol component is reacted in the absence of the urethane-forming catalysts with the polyisocyanate component in proportion so as to provide from 10 percent to 35 percent of free isocyanate groups in the reaction product based on the prepolymer. To prepare foam, the remaining portion of the polyol is added and the components are allowed to react together in the presence of the blowing agent and other appropriate additives such as the catalysts, and surfactants. Other additives may be added to either the isocyanate prepolymer or remaining polyol or both prior to the mixing of the components, whereby at the end of the reaction, rigid foam is provided.

Furthermore, the rigid foam can be prepared in a batch or continuous process by the one-shot or quasi-prepolymer methods using any well-known foaming apparatus. The rigid foam may be produced in the form of slab stock, moldings, cavity fillings, sprayed foam, frothed foam or laminates with other materials such as hardboard, plasterboard, plastics, paper or metal as facer substrates.

For closed-cell insulating foams, the object is to retain the blowing agent in the cells to maintain a low thermal conductivity of the insulating material, i.e., the rigid foam. Thus, high closed-cell content in the foam is desirable. In some implementations, the rigid foams produced according to implementations of this specification have a closed-cell content of more than 80 percent, more than 85 percent, or more than 88 percent, as measured according to ASTM D6226-15. Furthermore, the thermal conductivity of foams produced according to various implementations of the present specification indicates that the foams have acceptable insulating properties, i.e., the foams have a thermal conductivity measured at 35° F. (2° C.) of less than 0.126 BTU-in/h-ft$^2$-° F. and measured at 75° F. (24° C.) of less than 0.140 BTU-in/h-ft$^2$-° F. for foam from the core of 2-inch thick panels, as measured according to ASTM C518-15.

This specification also relates to the use of the rigid foams described herein for thermal insulation. That is, the rigid foams of the present specification may find use as an insulating material in refrigeration apparatuses. These rigid foams can be used, for example, as an intermediate layer in composite elements or for filling hollow spaces of refrigerators and freezers, or refrigerated trailers. These foams may also find use in the construction industry or for thermal insulation of long-distance heating pipes and containers.

As such, the present invention also provides a composite article comprising rigid foam as disclosed herein sandwiched between one or more facer substrates. In certain implementations, the facer substrate may be plastic (such a polypropylene resin reinforced with continuous bi-directional glass fibers or a fiberglass reinforced polyester copolymer), paper, wood, or metal. For example, in certain implementations, the composite article may be a refrigeration apparatus such as a refrigerator, freezer, or cooler with an exterior metal shell and interior plastic liner. In certain implementations, the refrigeration apparatus may be a trailer, and the composite article may include the foams produced according to the present invention in sandwich composites for trailer floors or sidewalls.

It has been found, surprisingly, that the particular polyurethane foam-forming compositions described herein, which utilize a combination of cis-1,1,1,4,4,4-hexafluoro-2-butene and trans-1,1,1,4,4,4-hexafluoro-2-butene as the physical blowing agents, are capable, when formulated with appropriate additives (surfactants, catalysts, etc.), of producing rigid polyurethane foams with similar, or even significantly improved, thermal insulation properties (as determined by K-factor measurements) compared to similar formulations that rely upon HCFO physical blowing agents, while still retaining other important foam properties and processing characteristics, such as dimensional stability, compressive strength, flow, reactivity and de-mold characteristics. Moreover, because the polyurethane foam-forming compositions described herein do not rely upon HCFO physical blowing agent, drawbacks associated with such blowing agents, especially their reaction with catalysts during aging, is avoided.

Various aspects of the subject matter described herein are set out in the following numbered clauses:

Clause 1. A polyurethane foam-forming composition comprising: (a) polyisocyanate; (b) a polyol blend comprising an aromatic amine-initiated polyether polyol having an OH number of at least 200 mg KOH/g and a functionality of at least 3, wherein (i) the aromatic amine-initiated polyether polyol having an OH number of at least 200 mg KOH/g is present in amount of at least 20% by weight, based on the total weight of polyol, and (ii) the polyol blend has a content of —$C_2H_4O$— units of 2 to 7% by weight, based on total weight of the polyurethane foam-forming composition; and (c) a physical blowing agent composition comprising (i) cis-1,1,1,4,4,4-hexafluoro-2-butene and (ii) trans-1,1,1,4,4,4-hexafluoro-2-butene.

Clause 2. The polyurethane foam-forming composition of clause 1, wherein the polyisocyanate comprises a methylene-bridged polyphenyl polyisocyanate and/or a prepolymer of methylene-bridged polyphenyl polyisocyanate having an average functionality of from 1.8 to 3.5 or 2.0 to 3.1, isocyanate moieties per molecule, and an NCO content of 25 to 32 weight percent.

Clause 3. The polyurethane foam-forming composition of clause 1 or clause 2, wherein the aromatic amine-initiated polyether polyol comprises a reaction product of an H-functional starter comprising an aromatic amine with alkylene oxide, wherein the aromatic amine comprises TDA, such as 2,3-TDA, 3,4-TDA, 2,4-TDA, 2,6-TDA or a mixture thereof, such as where the TDA comprises o-TDA.

Clause 4. The polyurethane foam-forming composition of clause 3, wherein the aromatic amine is present in an amount of more than 50% by weight, at least 80% by weight, at least 90% by weight, or 100% by weight, based on the total weight of H-functional starter used to produce the aromatic amine-initiated polyether polyol.

Clause 5. The polyurethane foam-forming composition of clause 3 or clause 4, wherein the alkylene oxide used to produce the aromatic amine-initiated polyether polyol comprises propylene oxide in an amount of more than 50% by weight, at least 80% by weight, at least 90% by weight, or 100% by weight, based on the total weight of alkylene oxide used to prepare the aromatic amine-initiated polyether polyol.

Clause 6. The polyurethane foam-forming composition of one of clause 3 to clause 5, wherein ethylene oxide is present in an amount of no more than 10% by weight, no more than 5% by weight, no more than 1% by weight, or, in some cases, 0% by weight, based on the total weight of alkylene oxide used to prepare the aromatic amine-initiated polyether polyol.

Clause 7. The polyurethane foam-forming composition of one of clause 1 to clause 6, wherein the aromatic amine-initiated polyether polyol has an OH number of 200 to 405 mg KOH/g or 380 to 420 mg KOH/g and/or an average functionality of 3.5 to 4.5, 3.8 to 4.2, or 4.0.

Clause 8. The polyurethane foam-forming composition of one of clause 1 to clause 7, wherein the aromatic amine-initiated polyether polyol is present in the polyol blend in an amount of 20 to 80% by weight, 30 to 70% by weight, or 40 to 60% by weight or 40 to 50% by weight, based on the total weight of polyol in the polyol blend.

Clause 9. The polyurethane foam-forming composition of one of clause 1 to clause 8, wherein the polyol blend comprises a saccharide-initiated polyether polyol that is a reaction product of an H-functional starter comprising saccharide with alkylene oxide.

Clause 10. The polyurethane foam-forming composition of clause 9, wherein the saccharide starter comprises sucrose, sorbitol, maltitol, or a mixture thereof.

Clause 11. The polyurethane foam-forming composition of clause 9 or clause 10, wherein the saccharide is present in an amount of more than 50% by weight, at least 70% by weight or at least 80% by weight, based on the total weight of H-functional starter used to produce the saccharide-initiated polyether polyol.

Clause 12. The polyurethane foam-forming composition of one of clause 9 to clause 11, wherein propylene oxide is used in an amount of more than 50% by weight, at least 80% by weight, at least 90% by weight, or 100% by weight, based on the total weight of alkylene oxide used to prepare the saccharide-initiated polyether polyol.

Clause 13. The polyurethane foam-forming composition of one of clause 9 to clause 12, wherein ethylene oxide is present in an amount of no more than 10% by weight, no more than 5% by weight, no more than 1% by weight, or, 0% by weight, based on the total weight of alkylene oxide used to prepare that saccharide-initiated polyether polyol.

Clause 14. The polyurethane foam-forming composition of one of clause 9 to clause 13, wherein the saccharide-initiated polyether polyol has an OH number of 200 to 600 mg KOH/g, 300 to 550 mg KOH/g, 380 to 500 mg KOH/g, or 450 to 500 mg KOH/g, and/or a functionality of 4 to 6, 5 to 6, 5.2 to 5.8, or 5.2 to 5.6.

Clause 15. The polyurethane foam-forming composition of one of clause 9 to clause 14, wherein the saccharide-initiated polyether polyol is present in an amount of at least 10% by weight, 10 to 50% by weight, 10 to 40% by weight, or 20 to 40% by weight, based on the total weight of polyol in the polyol blend.

Clause 16. The polyurethane foam-forming composition of one of clause 1 to clause 15, wherein the polyol blend comprises an aromatic polyester polyol, such as where the aromatic polyester polyol comprises a reaction product of an aromatic diacid or anhydride with a glycol or triol, such as a reaction product of ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane, or a mixture thereof, with phthalic acid, isophthalic acid, terephthalic acid, phthalic anhydride, or a mixture of thereof.

Clause 17. The polyurethane foam-forming composition of clause 16, wherein the aromatic polyester polyol has an OH number of 150 to 410 mg KOH/g, 150 to 360 mg KOH/g, 200 to 335 mg KOH/g, or 200 to 250 mg KOH/g, and/or a functionality of 1.5 to 3 or 1.9 to 2.5.

Clause 18. The polyurethane foam-forming composition of clause 16 or clause 17, wherein the aromatic polyester polyol is present in an amount of 5 to 40% by weight, 5 to 30% by weight, or 10 to 30% by weight, based upon the total weight of the polyol blend.

Clause 19. The polyurethane foam-forming composition of any one of clause 9 to clause 18, wherein the aromatic amine-initiated polyether polyol and the saccharide-initiated polyether polyol are present in the polyol blend is a weight ratio of at least 0.8:1, 1:1 to 5:1 or 1:1 to 2:1.

Clause 20. The polyurethane foam-forming composition of any one of clause 16 to clause 19, wherein the aromatic amine-initiated polyether polyol and the aromatic polyester polyol are present in the polyol blend in a weight ratio of at least 1:1, 1:1 to 5:1, or 1.5:1 to 2.5:1.

Clause 21. The polyurethane foam-forming composition of any one of clause 16 to clause 20, wherein the saccharide-initiated polyether polyol and the aromatic polyester polyol are present in the polyol blend in a weight ratio of at least 1:1, 1:1 to 5:1, or 1:1 to 1.5:1.

Clause 22. The polyurethane foam-forming composition of any one of clause 1 to clause 21, wherein the polyol blend has a weighted average functionality of 2 to 4, 3 to 4 or 3.5 to 4.0, and/or a weighted average hydroxyl number of 300 to 500 mg KOH/g or 300 to 400 mg KOH/g.

Clause 23. The polyurethane foam-forming composition of any one of clause 1 to clause 22, wherein the polyol blend is present in the polyurethane foam-forming composition in an amount of at least 50% by weight, 50 to 90% by weight or 60 to 80% by weight, based on the total weight of the polyurethane foam-forming composition except for the weight of the polyisocyanate.

Clause 24. The polyurethane foam-forming composition of any one of clause 1 to clause 23, wherein the polyol blend has a content of —$C_2H_4O$— units of 3 to 6% by weight or 4 to 6% by weight, based on total weight of the polyurethane foam-forming composition.

Clause 25. The polyurethane foam-forming composition of any one of clause 1 to clause 23, wherein the polyether polyol in the polyol blend has a content of —$C_2H_4O$— units of no more than 5% by weight, such as no more than 2% by weight or no more than 1% by weight, based on total weight of polyol.

Clause 26. The polyurethane foam-forming composition of any one of clause 1 to clause 25, wherein cis-1,1,1,4,4,4-hexafluoro-2-butene and trans-1,1,1,4,4,4-hexafluoro-2-butene are present in the physical blowing agent composition in a relative ratio, by weight, of greater than 1:1, 1.5:1 to 4:1, 1.8:1 to 3:1, or 2.2:1 to 2.4:1.

Clause 27. The polyurethane foam-forming composition of any one of clause 1 to clause 26, wherein the sum of the amount of cis-1,1,1,4,4,4-hexafluoro-2-butene and trans-1,1,1,4,4,4-hexafluoro-2-butene represents more than 50% by weight, at least 60% by weight, at least 70% by weight, at least 80% by weight, at least 90% by weight, at least 95% by weight, or at least 99% by weight, of the total weight of the physical blowing agent composition.

Clause 28. The polyurethane foam-forming composition of any one of clause 1 to clause 27, wherein the physical blowing agent composition is present in an amount of at least 10% by weight, 10 to 30% by weight, or 20 to 30% by weight, based on the total weight of the polyurethane foam-forming composition except for the weight of the polyisocyanate.

Clause 29. The polyurethane foam-forming composition of any one of clause 1 to clause 28, further comprising a carbon dioxide generating chemical blowing agent, such as water and/or a formate-blocked amine.

Clause 30. The polyurethane foam-forming composition of clause 29, wherein the carbon dioxide generating chemical blowing agent is present in an amount of from 0.5 to 5.0% by weight, 1.5 to 4% by weight, 1.0 to 3.0% by weight, or 2.0 to 3.0% by weight, based on the total weight of the polyurethane foam-forming composition except for the weight of the polyisocyanate.

Clause 31. The polyurethane foam-forming composition of clause 29 or clause 30, wherein the physical blowing agent composition and the carbon dioxide generating chemical blowing agent are present in a relative ratio, by weight, of at least 5:1, 5:1 to 50:1, 5:1 to 30:1 or 10:1 to 20:1.

Clause 32. The polyurethane foam-forming composition of any one of clause 1 to clause 32, further comprising a surfactant comprising polysiloxane-polyalkyene-block copolymers, such as a polyether-modified polysiloxane, that is present in an amount of 0.2 to 5.0% by weight or 1 to 3% by weight, based on the total weight of the polyurethane foam-forming composition except for the weight of the polyisocyanate.

Clause 33. The polyurethane foam-forming composition of any one of clause 1 to clause 33, further comprising a catalyst comprising a tertiary amine, a tertiary phosphine, a metal chelate, an acid metal salt, a strong base, a metal alcoholate and/or phenolate, a metal salt of an organic acid, or a combination thereof.

Clause 34. A process for producing rigid polyurethane foam comprising reacting the mixing the polyurethane foam-forming composition of any one of clause 1 to clause 33 at an isocyanate index of 0.90 to 1.50 or 1.20 to 1.50.

Clause 35. A polyurethane foam produced by the process of clause 34 or produced from the polyurethane foam-forming composition of any one of clause 1 to clause 33, wherein the polyurethane foam has a closed-cell content of more than 80 percent, more than 85 percent, or more than 88 percent, as measured according to ASTM D6226-15 and/or a thermal conductivity measured at 35° F. (2° C.) of less than 0.126 BTU-in/h-ft2-° F. and measured at 75° F. (24° C.) of less than 0.140 BTU-in/h-ft2-° F. for foam from the core of 2-inch thick panels, as measured according to ASTM C518-15.

Clause 36. A composite article comprising the polyurethane foam of clause 35 sandwiched between one or more facer substrates, such as where the facer substrates are constructed of plastic (such a polypropylene resin reinforced with continuous bi-directional glass fibers or a fiberglass reinforced polyester copolymer), paper, wood, or metal.

Clause 37. A refrigeration apparatus comprising the composite article of clause 36.

Clause 38. A method of producing a polyurethane foam, comprising reacting a polyol blend with a polyisocyanate at an isocyanate index of 0.70 to 1.50 in the presence of components comprising a physical blowing agent composition, wherein: (1) the polyol blend comprises an aromatic amine-initiated polyether polyol having an OH number of at least 200 mg KOH/g and a functionality of at least 3, the aromatic amine-initiated polyether polyol having an OH number of at least 200 mg KOH/g is present in amount of at least 20% by weight, based on the total weight of polyol, and the polyol blend has a content of —C$_2$H$_4$O— units of 2 to 7% by weight, based on total weight of the polyurethane foam; and (2) the blowing agent composition comprises cis-1,1,1,4,4,4-hexafluoro-2-butene and trans-1,1,1,4,4,4-hexafluoro-2-butene.

Clause 39. The method of clause 38, wherein the polyisocyanate comprises a methylene-bridged polyphenyl polyisocyanate and/or a prepolymer of methylene-bridged polyphenyl polyisocyanate having an average functionality of from 1.8 to 3.5 or 2.0 to 3.1, isocyanate moieties per molecule, and an NCO content of 25 to 32 weight percent.

Clause 40. The method of clause 38 or clause 39, wherein the aromatic amine-initiated polyether polyol comprises a reaction product of an H-functional starter comprising an aromatic amine with alkylene oxide, wherein the aromatic amine comprises TDA, such as 2,3-TDA, 3,4-TDA, 2,4-TDA, 2,6-TDA or a mixture thereof, such as where the TDA comprises o-TDA.

Clause 41. The method of clause 40, wherein the aromatic amine is present in an amount of more than 50% by weight, at least 80% by weight, at least 90% by weight, or 100% by weight, based on the total weight of H-functional starter used to produce the aromatic amine-initiated polyether polyol.

Clause 42. The method of clause 40 or clause 41, wherein the alkylene oxide used to produce the aromatic amine-initiated polyether polyol comprises propylene oxide in an amount of more than 50% by weight, at least 80% by weight, at least 90% by weight, or 100% by weight, based on the total weight of alkylene oxide used to prepare the aromatic amine-initiated polyether polyol.

Clause 43. The method of one of clause 40 to clause 42, wherein ethylene oxide is present in an amount of no more than 10% by weight, no more than 5% by weight, no more than 1% by weight, or, in some cases, 0% by weight, based on the total weight of alkylene oxide used to prepare the aromatic amine-initiated polyether polyol.

Clause 44. The method of one of clause 38 to clause 43, wherein the aromatic amine-initiated polyether polyol has an OH number of 200 to 405 mg KOH/g or 380 to 420 mg KOH/g and/or an average functionality of 3.5 to 4.5, 3.8 to 4.2, or 4.0.

Clause 45. The method of one of clause 38 to clause 44, wherein the aromatic amine-initiated polyether polyol is present in the polyol blend in an amount of 20 to 80% by weight, 30 to 70% by weight, or 40 to 60% by weight or 40 to 50% by weight, based on the total weight of polyol in the polyol blend.

Clause 46. The method of one of clause 38 to clause 45, wherein the polyol blend comprises a saccharide-initiated polyether polyol that is a reaction product of an H-functional starter comprising saccharide with alkylene oxide.

Clause 47. The method of clause 46, wherein the saccharide starter comprises sucrose, sorbitol, maltitol, or a mixture thereof.

Clause 48. The method of clause 46 or clause 47, wherein the saccharide is present in an amount of more than 50% by weight, at least 70% by weight or at least 80% by weight, based on the total weight of H-functional starter used to produce the saccharide-initiated polyether polyol.

Clause 49. The method of one of clause 46 to clause 48, wherein propylene oxide is used in an amount of more than 50% by weight, at least 80% by weight, at least 90% by weight, or 100% by weight, based on the total weight of alkylene oxide used to prepare the saccharide-initiated polyether polyol.

Clause 50. The method of one of clause 46 to clause 49, wherein ethylene oxide is present in an amount of no more than 10% by weight, no more than 5% by weight, no more than 1% by weight, or, 0% by weight, based on the total weight of alkylene oxide used to prepare that saccharide-initiated polyether polyol.

Clause 51. The method of one of clause 46 to clause 50, wherein the saccharide-initiated polyether polyol has an OH number of 200 to 600 mg KOH/g, 300 to 550 mg KOH/g, 380 to 500 mg KOH/g, or 450 to 500 mg KOH/g, and/or a functionality of 4 to 6, 5 to 6, 5.2 to 5.8, or 5.2 to 5.6.

Clause 52. The method of one of clause 46 to clause 51, wherein the saccharide-initiated polyether polyol is present in an amount of at least 10% by weight, 10 to 50% by weight, 10 to 40% by weight, or 20 to 40% by weight, based on the total weight of polyol in the polyol blend.

Clause 53. The method of one of clause 38 to clause 52, wherein the polyol blend comprises an aromatic polyester polyol, such as where the aromatic polyester polyol comprises a reaction product of an aromatic diacid or anhydride with a glycol or triol, such as a reaction product of ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane, or a mixture thereof, with phthalic acid, isophthalic acid, terephthalic acid, phthalic anhydride, or a mixture of thereof.

Clause 54. The method of clause 53, wherein the aromatic polyester polyol has an OH number of 150 to 410 mg KOH/g, 150 to 360 mg KOH/g, 200 to 335 mg KOH/g, or 200 to 250 mg KOH/g, and/or a functionality of 1.5 to 3 or 1.9 to 2.5.

Clause 55. The method of clause 53 or clause 54, wherein the aromatic polyester polyol is present in an amount of 5 to 40% by weight, 5 to 30% by weight, or 10 to 30% by weight, based upon the total weight of the polyol blend.

Clause 56. The method of any one of clause 46 to clause 55, wherein the aromatic amine-initiated polyether polyol and the saccharide-initiated polyether polyol are present in the polyol blend is a weight ratio of at least 0.8:1, 1:1 to 5:1 or 1:1 to 2:1.

Clause 57. The method of clause 53 to clause 56, wherein the aromatic amine-initiated polyether polyol and the aromatic polyester polyol are present in the polyol blend in a weight ratio of at least 1:1, 1:1 to 5:1, or 1.5:1 to 2.5:1.

Clause 58. The method of any one of clause 53 to clause 57, wherein the saccharide-initiated polyether polyol and the aromatic polyester polyol are present in the polyol blend in a weight ratio of at least 1:1, 1:1 to 5:1, or 1:1 to 1.5:1.

Clause 59. The method of any one of clause 38 to clause 58, wherein the polyol blend has a weighted average functionality of 2 to 4, 3 to 4 or 3.5 to 4.0, and/or a weighted average hydroxyl number of 300 to 500 mg KOH/g or 300 to 400 mg KOH/g.

Clause 60. The method of any one of clause 38 to clause 59, wherein the polyol blend is present in the polyurethane foam-forming composition in an amount of at least 50% by weight, 50 to 90% by weight or 60 to 80% by weight, based on the total weight of the polyurethane foam-forming composition except for the weight of the polyisocyanate.

Clause 61. The method of any one of clause 38 to clause 60, wherein the polyol blend has a content of —$C_2H_4O$— units of 3 to 6% by weight or 4 to 6% by weight, based on total weight of the polyurethane foam.

Clause 62. The method of any one of clause 38 to clause 61, wherein the polyether polyol in the polyol blend has a content of —$C_2H_4O$— units of no more than 5% by weight, such as no more than 2% by weight or no more than 1% by weight, based on total weight of polyol.

Clause 63. The method of any one of clause 38 to clause 62, wherein cis-1,1,1,4,4,4-hexafluoro-2-butene and trans-1,1,1,4,4,4-hexafluoro-2-butene are present in the physical blowing agent composition in a relative ratio, by weight, of greater than 1:1, 1.5:1 to 4:1, 1.8:1 to 3:1, or 2.2:1 to 2.4:1.

Clause 64. The method of any one of clause 38 to clause 63, wherein the sum of the amount of cis-1,1,1,4,4,4-hexafluoro-2-butene and trans-1,1,1,4,4,4-hexafluoro-2-butene represents more than 50% by weight, at least 60% by weight, at least 70% by weight, at least 80% by weight, at least 90% by weight, at least 95% by weight, or at least 99% by weight, of the total weight of the physical blowing agent composition.

Clause 65. The method of any one of clause 38 to clause 64, wherein the physical blowing agent composition is present in an amount of at least 10% by weight, 10 to 30% by weight, or 20 to 30% by weight, based on the total weight of the polyurethane foam-forming composition except for the weight of the polyisocyanate.

Clause 66. The method of any one of clause 38 to clause 65, further comprising a carbon dioxide generating chemical blowing agent, such as water and/or a formate-blocked amine.

Clause 67. The method of clause 66, wherein the carbon dioxide generating chemical blowing agent is present in an amount of from 0.5 to 5.0% by weight, 1.5 to 4% by weight, 1.0 to 3.0% by weight, or 2.0 to 3.0% by weight, based on the total weight of the polyurethane foam-forming composition except for the weight of the polyisocyanate.

Clause 68. The method of clause 66 or clause 67, wherein the physical blowing agent composition and the carbon dioxide generating chemical blowing agent are present in a relative ratio, by weight, of at least 5:1, 5:1 to 50:1, 5:1 to 30:1 or 10:1 to 20:1.

Clause 69. The method of any one of clause 38 to clause 68, further comprising a surfactant comprising polysiloxane-polyalkyene-block copolymers, such as a polyether-modified polysiloxane, that is present in an amount of 0.2 to 5.0% by weight or 1 to 3% by weight, based on the total weight of the polyurethane foam-forming composition except for the weight of the polyisocyanate.

Clause 70. The method of any one of clause 38 to clause 69, further comprising a catalyst comprising a tertiary amine, a tertiary phosphine, a metal chelate, an acid metal salt, a strong base, a metal alcoholate and/or phenolate, a metal salt of an organic acid, or a combination thereof Clause 71. An isocyanate-reactive composition comprising: (a) a polyol blend comprising an aromatic amine-initiated polyether polyol having an OH number of at least 200 mg KOH/g and a functionality of at least 3, wherein (i) the aromatic amine-initiated polyether polyol having an OH number of at least 200 mg KOH/g is present in amount of at least 20% by weight, based on the total weight of polyol, and (ii) the polyol blend has a content of —$C_2H_4O$— units of 4 to 15% by weight, based on total weight of the isocyanate-reactive composition; and (b) a physical blowing agent composition comprising cis-1,1,1,4,4,4-hexafluoro-2-butene and trans-1,1,1,4,4,4-hexafluoro-2-butene.

Clause 72. The isocyanate-reactive composition of clause 71, wherein the aromatic amine-initiated polyether polyol comprises a reaction product of an H-functional starter comprising an aromatic amine with alkylene oxide, wherein the aromatic amine comprises TDA, such as 2,3-TDA, 3,4-TDA, 2,4-TDA, 2,6-TDA or a mixture thereof, such as where the TDA comprises o-TDA.

Clause 73. The isocyanate-reactive composition of clause 72, wherein the aromatic amine is present in an amount of more than 50% by weight, at least 80% by weight, at least 90% by weight, or 100% by weight, based on the total weight of H-functional starter used to produce the aromatic amine-initiated polyether polyol.

Clause 74. The isocyanate-reactive composition of clause 72 or clause 73, wherein the alkylene oxide used to produce the aromatic amine-initiated polyether polyol comprises propylene oxide in an amount of more than 50% by weight, at least 80% by weight, at least 90% by weight, or 100% by weight, based on the total weight of alkylene oxide used to prepare the aromatic amine-initiated polyether polyol.

Clause 75. The isocyanate-reactive composition of one of clause 72 to clause 74, wherein ethylene oxide is present in an amount of no more than 10% by weight, no more than 5% by weight, no more than 1% by weight, or, in some cases, 0% by weight, based on the total weight of alkylene oxide used to prepare the aromatic amine-initiated polyether polyol.

Clause 76. The isocyanate-reactive composition of one of clause 71 to clause 75, wherein the aromatic amine-initiated polyether polyol has an OH number of 200 to 405 mg KOH/g or 380 to 420 mg KOH/g and/or an average functionality of 3.5 to 4.5, 3.8 to 4.2, or 4.0.

Clause 77. The isocyanate-reactive composition of one of clause 71 to clause 76, wherein the aromatic amine-initiated polyether polyol is present in the polyol blend in an amount of 20 to 80% by weight, 30 to 70% by weight, or 40 to 60% by weight or 40 to 50% by weight, based on the total weight of polyol in the polyol blend.

Clause 78. The isocyanate-reactive composition of one of clause 71 to clause 77, wherein the polyol blend comprises a saccharide-initiated polyether polyol that is a reaction product of an H-functional starter comprising saccharide with alkylene oxide.

Clause 79. The isocyanate-reactive composition of clause 78, wherein the saccharide starter comprises sucrose, sorbitol, maltitol, or a mixture thereof.

Clause 80. The isocyanate-reactive composition of clause 77 or clause 78, wherein the saccharide is present in an amount of more than 50% by weight, at least 70% by weight or at least 80% by weight, based on the total weight of H-functional starter used to produce the saccharide-initiated polyether polyol.

Clause 81. The isocyanate-reactive composition of one of clause 77 to clause 80, wherein propylene oxide is used in an amount of more than 50% by weight, at least 80% by weight, at least 90% by weight, or 100% by weight, based on the total weight of alkylene oxide used to prepare the saccharide-initiated polyether polyol.

Clause 82. The isocyanate-reactive composition of one of clause 77 to clause 81, wherein ethylene oxide is present in an amount of no more than 10% by weight, no more than 5% by weight, no more than 1% by weight, or, 0% by weight, based on the total weight of alkylene oxide used to prepare that saccharide-initiated polyether polyol.

Clause 83. The isocyanate-reactive composition of one of clause 77 to clause 82, wherein the saccharide-initiated polyether polyol has an OH number of 200 to 600 mg KOH/g, 300 to 550 mg KOH/g, 380 to 500 mg KOH/g, or 450 to 500 mg KOH/g, and/or a functionality of 4 to 6, 5 to 6, 5.2 to 5.8, or 5.2 to 5.6.

Clause 84. The isocyanate-reactive composition of one of clause 77 to clause 83, wherein the saccharide-initiated polyether polyol is present in an amount of at least 10% by weight, 10 to 50% by weight, 10 to 40% by weight, or 20 to 40% by weight, based on the total weight of polyol in the polyol blend.

Clause 85. The isocyanate-reactive composition of one of clause 71 to clause 84, wherein the polyol blend comprises an aromatic polyester polyol, such as where the aromatic polyester polyol comprises a reaction product of an aromatic diacid or anhydride with a glycol or triol, such as a reaction product of ethylene glycol, propylene glycol, butylene glycol, 1,3-butanediol, neopentyl glycol, diethylene glycol, dipropylene glycol, triethylene glycol, tripropylene glycol, glycerol, trimethylolethane, trimethyolpropane, pentanediol, hexanediol, heptanediol, 1,3- and 1,4-dimethylol cyclohexane, or a mixture thereof, with phthalic acid, isophthalic acid, terephthalic acid, phthalic anhydride, or a mixture of thereof.

Clause 86. The isocyanate-reactive composition of clause 85, wherein the aromatic polyester polyol has an OH number of 150 to 410 mg KOH/g, 150 to 360 mg KOH/g, 200 to 335 mg KOH/g, or 200 to 250 mg KOH/g, and/or a functionality of 1.5 to 3 or 1.9 to 2.5.

Clause 87. The isocyanate-reactive composition of clause 85 or clause 86, wherein the aromatic polyester polyol is present in an amount of 5 to 40% by weight, 5 to 30% by weight, or 10 to 30% by weight, based upon the total weight of the polyol blend.

Clause 88. The isocyanate-reactive composition of any one of clause 83 to clause 87, wherein the aromatic amine-initiated polyether polyol and the saccharide-initiated polyether polyol are present in the polyol blend is a weight ratio of at least 0.8:1, 1:1 to 5:1 or 1:1 to 2:1.

Clause 89. The isocyanate-reactive composition of any one of clause 85 to clause 88, wherein the aromatic amine-initiated polyether polyol and the aromatic polyester polyol are present in the polyol blend in a weight ratio of at least 1:1, 1:1 to 5:1, or 1.5:1 to 2.5:1.

Clause 90. The isocyanate-reactive composition of any one of clause 85 to clause 89, wherein the saccharide-initiated polyether polyol and the aromatic polyester polyol are present in the polyol blend in a weight ratio of at least 1:1, 1:1 to 5:1, or 1:1 to 1.5:1.

Clause 91. The isocyanate-reactive composition of any one of clause 71 to clause 90, wherein the polyol blend has a weighted average functionality of 2 to 4, 3 to 4 or 3.5 to 4.0, and/or a weighted average hydroxyl number of 300 to 500 mg KOH/g or 300 to 400 mg KOH/g.

Clause 92. The isocyanate-reactive composition of any one of clause 71 to clause 91, wherein the polyol blend is present in the polyurethane foam-forming composition in an amount of at least 50% by weight, 50 to 90% by weight or 60 to 80% by weight, based on the total weight of the isocyanate-reactive composition.

Clause 93. The isocyanate-reactive composition of any one of clause 71 to clause 92, wherein the polyol blend has a content of $-C_2H_4O-$ units of 6 to 12% by weight or 8 to 12% by weight, based on total weight of the isocyanate-reactive composition.

Clause 94. The isocyanate-reactive composition of any one of clause 71 to clause 93, wherein the polyether polyol in the polyol blend has a content of $-C_2H_4O-$ units of no more than 5% by weight, such as no more than 2% by weight or no more than 1% by weight, based on total weight of polyol.

Clause 95. The isocyanate-reactive composition of any one of clause 71 to clause 94, wherein cis-1,1,1,4,4,4-hexafluoro-2-butene and trans-1,1,1,4,4,4-hexafluoro-2-butene are present in the physical blowing agent composition in a relative ratio, by weight, of greater than 1:1, 1.5:1 to 4:1, 1.8:1 to 3:1, or 2.2:1 to 2.4:1.

Clause 96. The isocyanate-reactive composition of any one of clause 71 to clause 95, wherein the sum of the amount of cis-1,1,1,4,4,4-hexafluoro-2-butene and trans-1,1,1,4,4,4-hexafluoro-2-butene represents more than 50% by weight, at least 60% by weight, at least 70% by weight, at least 80% by weight, at least 90% by weight, at least 95% by weight, or at least 99% by weight, of the total weight of the physical blowing agent composition.

Clause 97. The isocyanate-reactive composition of any one of clause 71 to clause 96, wherein the physical blowing agent composition is present in an amount of at least 10% by weight, 10 to 30% by weight, or 20 to 30% by weight, based on the total weight of the isocyanate-reactive composition.

Clause 98. The isocyanate-reactive composition of any one of clause 71 to clause 97, further comprising a carbon dioxide generating chemical blowing agent, such as water and/or a formate-blocked amine.

Clause 99. The isocyanate-reactive composition of clause 98, wherein the carbon dioxide generating chemical blowing agent is present in an amount of from 0.5 to 5.0% by weight, 1.5 to 4% by weight, 1.0 to 3.0% by weight, or 2.0 to 3.0% by weight, based on the total weight of the isocyanate-reactive composition.

Clause 100. The isocyanate-reactive composition of clause 98 or clause 99, wherein the physical blowing agent composition and the carbon dioxide generating chemical blowing agent are present in a relative ratio, by weight, of at least 5:1, 5:1 to 50:1, 5:1 to 30:1 or 10:1 to 20:1.

Clause 101. The isocyanate-reactive composition of any one of clause 71 to clause 100, further comprising a surfactant comprising polysiloxane-polyalkyene-block copolymers, such as a polyether-modified polysiloxane, that is present in an amount of 0.2 to 5.0% by weight or 1 to 3% by weight, based on the total weight of the polyurethane foam-forming composition except for the weight of the polyisocyanate.

Clause 102. The isocyanate-reactive composition of any one of clause 71 to clause 101, further comprising a catalyst comprising a tertiary amine, a tertiary phosphine, a metal chelate, an acid metal salt, a strong base, a metal alcoholate and/or phenolate, a metal salt of an organic acid, or a combination thereof.

Clause 103. A process for producing rigid polyurethane foam comprising reacting the mixing the isocyanate-reactive composition of any one of clause 71 to clause 102 with a polyisocyanate at an isocyanate index of 0.90 to 1.50 or 1.20 to 1.50.

Clause 104. A polyurethane foam produced by the process of clause 103 or produced from the isocyanate-reactive composition of any one of clause 71 to clause 102, wherein the polyurethane foam has a closed-cell content of more than 80 percent, more than 85 percent, or more than 88 percent, as measured according to ASTM D6226-15 and/or a thermal conductivity measured at 35° F. (2° C.) of less than 0.126 BTU-in/h-ft2-° F. and measured at 75° F. (24° C.) of less than 0.140 BTU-in/h-ft2-° F. for foam from the core of 2-inch thick panels, as measured according to ASTM C518-15.

Clause 105. A composite article comprising the polyurethane foam of clause 104 sandwiched between one or more facer substrates, such as where the facer substrates are constructed of plastic (such a polypropylene resin reinforced with continuous bi-directional glass fibers or a fiberglass reinforced polyester copolymer), paper, wood, or metal.

Clause 106. A refrigeration apparatus comprising the composite article of clause 105.

The non-limiting and non-exhaustive examples that follow are intended to further describe various non-limiting and non-exhaustive implementations without restricting the scope of the implementations described in this specification.

EXAMPLES

Examples 1-16

Foam-forming compositions were prepared using the ingredients and amounts (in parts by weight) set forth in Table 1. The following materials were used:

POLYOL 1: a polyether polyol having a hydroxyl number of 388 mgKOH/g and a functionality of 4, prepared by alkoxylating o-TDA, in which the alkylene oxide is 37% by weight ethylene oxide and 63% by weight propylene oxide so that the polyether polyol has a content of $-C_2H_4O-$ units of 29.2% by weight, based on total weight of the polyether polyol;

POLYOL 2: a polyether polyol having a hydroxyl number of 400 mg KOH/g and a functionality of 4, prepared by alkoxylating o-TDA, in which the alkylene oxide is 100% propylene oxide so that the polyether polyol has no $-C_2H_4O-$ units;

POLYOL 3: a polyether polyol having a hydroxyl number of 388 mg KOH/g and a functionality of 5.3, prepared by alkoxylating a mixture of sucrose and water, in which the alkylene oxide is 100% propylene oxide so that the polyether polyol has no $-C_2H_4O-$ units;

POLYOL 4: a polyether polyol having a hydroxyl number of 470 mg KOH/g and a functionality of 5.5, prepared by alkoxylating a mixture of sucrose and water, in which the alkylene oxide is 30% by weight ethylene oxide and 70% by weight propylene oxide so that the polyether polyol has a content of $-C_2H_4O-$ units of 20.5% by weight, based on total weight of the polyether polyol;

POLYOL 5: a polyether polyol having a hydroxyl number of 700 mg KOH/g and a functionality of 3, prepared by alkoxylating monoethanolamine, in which the alkylene oxide is 100% propylene oxide so that the polyether polyol has no —C$_2$H$_4$O— units;

POLYOL 6: an aromatic polyester polyol having an OH number of 240 mg KOH/g and a functionality of 2, and a content of —C$_2$H$_4$O— units of 44.9% by weight, based on total weight of the aromatic polyester polyol;

SURFACTANT 1: Dabco® DC5357 from Evonik;
SURFACTANT 2: Niax™ L-6642 from Momentive;
SURFACTANT 3: Dabco® B-84207 from Evonik;
SURFACTANT 4: Dabco® B-8465 from Evonik;
SURFACTANT 5: Dabco® B-84205 from Evonik;
CATALYST 1: N,N,N',N",N"-pentamethyldiethylenetriamine, Polycat™ 5 from Evonik;
CATALYST 2: solution of potassium-octoate in diethylene glycol, Dabco® K-15 from Evonik;
BLOWING AGENT 1: trans-1,1,1-trifluoro-3-chloropropene, Solstice® from Honeywell International Inc.;
BLOWING AGENT 2: a combination of 70% by weight cis-1,1,1,4,4,4-hexafluoro-2-butene (Opteon™ 1100 from Chemours) and 30% by weight trans-1,1,1,4,4,4-hexafluoro-2-butene (Opteon™ 1150 from Chemours); and
ISO: polymeric diphenylmethane diisocyanate (pMDI); NCO weight 31.5%; viscosity 200 mPa s @ 25° C.; equivalent weight 133; functionality 2.8 (MONDUR® MR from Covestro LLC);

In each case, a master batch was prepared by mixing the polyols, catalysts, surfactant, water and blowing agents in the amounts indicated in Table 1. Foams were prepared by mixing the masterbatch with the ISO in an amount sufficient to provide the isocyanate index listed in Table 1 and pouring the mixture into an 83 ounce paper cup. The cream time, gel time, tack-free time and free rise density ("FRD") were recorded.

Foam panels were also prepared by hand using an air-powered mixer (~3000 rpm) and utilizing a temperature controlled mold (120° F.; dimensions of 25"×13"×2"). The polyol premix and isocyanate temperatures were maintained at 25° C. and all samples were demolded after 3 minutes. Minimum fill was determined by slightly overfilling the mold cavity and then removing the excess foam such that the foam weight contained in the 25"×13"×2" volume could be measured. After determining the minimum fill value, foam panels were prepared to obtain a desired density approximately[8]-12% over the minimum fill density. Results are in Table 1.

A 8.8"×8.8"×4.0" mold at a temperature of 40° C. was also utilized to determine swell values. Lab swell was determined by mixing the masterbatch with the ISO in an amount sufficient to provide the isocyanate index listed in Table 1 and achieve an overpack value of 25% and pouring the mixture into the mold. The minimum fill density, and consequent amount of foam required to achieve 25% overpack, was determined by dividing 209 by the final height the foam achieves in the flow tube. After the foam was dispensed, the lid was clamped shut and the foam allowed to cure for 5 min. After 5 minutes, the lid was slowly opened and the part removed from the mold. After an additional 30 minutes, the thickness of the part was measured at the most center point of the part and the swell value calculated. Flow was evaluated as described in U.S. Pat. No. 10,106,641 (at col. 12, lines 22-61, the cited portion of which being incorporated herein by reference). Additionally, a pressure transducer was located 10 cm above the protruding sheet metal based edge, which recorded the foaming pressure during the process. The rise rate was derived from the foam height data as a function of time. The rise rate profiles are displayed in FIG. 1.

Results are set forth in Table 1 (reported results represent the average results of three replicate experiments).

TABLE 1

| Material | Ex. 1 | Ex. 2 | Ex. 3 | Ex. 4 | Ex. 5 | Ex. 6 |
|---|---|---|---|---|---|---|
| POLYOL 1 | 30.91 | — | — | — | — | — |
| POLYOL 2 | — | 30.91 | 34.65 | 41.06 | 30.00 | 30.00 |
| POLYOL 3 | 20.69 | 20.69 | 25.00 | — | 10.00 | 10.00 |
| POLYOL 4 | — | — | — | 19.00 | 23.77 | 25.81 |
| POLYOL 5 | — | — | — | — | — | — |
| POLYOL 6 | 17.17 | 17.17 | 9.00 | 9.00 | 5.00 | 5.00 |
| SURFACTANT 1 | 2.71 | 2.71 | 2.71 | 2.71 | 2.71 | 2.71 |
| SURFACTANT 2 | — | — | — | — | — | — |
| SURFACTANT 3 | — | — | — | — | — | — |
| SURFACTANT 4 | — | — | — | — | — | — |
| SURFACTANT 5 | — | — | — | — | — | — |
| CATALYST 1 | 0.84 | 0.84 | 0.90 | 0.84 | 0.84 | 0.84 |
| CATALYST 2 | 0.84 | 0.84 | 0.90 | 0.55 | 0.84 | 0.84 |
| Water | 1.59 | 1.59 | 1.59 | 1.59 | 1.59 | 1.80 |
| BLOWING AGENT 1 | — | — | — | — | — | — |
| BLOWING AGENT 2 | 25.25 | 25.25 | 25.25 | 25.25 | 25.25 | 23.00 |
| INDEX | 1.41 | 1.40 | 1.35 | 1.28 | 1.26 | 1.19 |
| —C$_2$H$_4$O— units from PET[1] | 9.0% | 0.0% | 0.0% | 3.9% | 4.9% | 5.3% |
| —C$_2$H$_4$O— units from PES[1] | 7.7% | 7.7% | 4.0% | 4.0% | 2.2% | 2.2% |
| Total —C$_2$H$_4$O— units in foam-forming composition[2] | 7.8% | 3.6% | 1.9% | 3.7% | 3.3% | 3.5% |
| RESULTS | | | | | | |
| Cream Time (sec) | 7 | 4 | 4 | 4 | 5 | 5 |
| Gel Time (sec) | 75 | 51 | 50 | 45 | 51 | 53 |
| Tack Free Time (sec) | 104 | 70 | 67 | 60 | 66 | 62 |
| Free Rise Density (pcf) | 1.76 | 1.77 | 1.83 | 1.81 | 1.75 | 1.80 |
| K-factor @35° F. (((BTU*in)/(h*ft2*° F.)) | 0.130 | 0.125 | 0.132 | 0.129 | 0.131 | 0.130 |
| K-factor @75° F. (((BTU*in)/(h*ft2*° F.)) | 0.140 | 0.139 | 0.144 | 0.142 | 0.142 | 0.143 |
| Closed Cell Content (%) | 88.0 | 87.2 | 80.7 | 81.0 | 85.2 | 86.3 |
| Compressive Strength + (psi) | 22.3 | 14.3 | 18.2 | 14.1 | 20.3 | 19.5 |

TABLE 1-continued

| | | | | | | |
|---|---|---|---|---|---|---|
| Compressive Strength = (psi) | 31.4 | 30.5 | 32.2 | 30.6 | 35.4 | 34.8 |
| Dimensional Stability −30° C. @ 1 day (%) | 0.10 | −0.3 | 0.2 | 0.2 | −0.2 | −0.4 |
| Dimensional Stability −30° C. @ 7 days (%) | −0.20 | −0.1 | 0.2 | −0.1 | −0.3 | −0.1 |
| Dimensional Stability 70° C. @ 1 day (%) | −0.40 | 0.1 | 0.5 | 0.8 | −0.4 | 0.1 |
| Dimensional Stability 70° C. @ 1 day (%) | −0.55 | 0.7 | 1.8 | 2.1 | −0.3 | −0.4 |
| Swell (in) | — | 0.057 | 0.027 | 0.004 | −0.100 | 0.007 |

Flow

| | | | | | | |
|---|---|---|---|---|---|---|
| Max Pressure (hPa) | 90 | 110 | 105 | 129 | 92 | 120 |
| Final Height (cm) | 102 | 99 | 97 | 99 | 93 | 90 |
| Max Rise Time (s) | 23 | 14 | 17 | 14 | 18 | 20 |
| Max Rise Rate (cm/s) | 2.2 | 2.9 | 2.6 | 2.7 | 2.1 | 2.1 |

| Material | Ex. 7 | Ex. 8 | Ex. 9 | Ex. 10 | Ex. 11 | Ex. 12 |
|---|---|---|---|---|---|---|
| POLYOL 1 | — | — | — | — | — | — |
| POLYOL 2 | 30.91 | 30.91 | 30.91 | 30.91 | 27.60 | 37.60 |
| POLYOL 3 | 20.69 | 20.69 | 20.4 | 20.69 | — | — |
| POLYOL 4 | — | — | — | — | 24.00 | 14.00 |
| POLYOL 5 | — | — | — | — | — | — |
| POLYOL 6 | 17.17 | 17.17 | 17.17 | 17.17 | 17.17 | 17.17 |
| SURFACTANT 1 | — | — | 3.00 | — | 2.71 | 2.71 |
| SURFACTANT 2 | 2.71 | — | — | — | — | — |
| SURFACTANT 3 | — | 2.71 | — | — | — | — |
| SURFACTANT 4 | — | — | — | — | — | — |
| SURFACTANT 5 | — | — | — | 2.71 | — | — |
| CATALYST 1 | 0.84 | 0.84 | 0.84 | 0.84 | 0.84 | 0.84 |
| CATALYST 2 | 0.84 | 0.84 | 0.84 | 0.84 | 0.84 | 0.84 |
| Water | 1.59 | 1.59 | 1.59 | 1.59 | 1.59 | 1.59 |
| BLOWING AGENT 1 | — | — | — | — | — | — |
| BLOWING AGENT 2 | 25.25 | 25.25 | 25.25 | 25.25 | 25.25 | 25.25 |
| INDEX | 1.40 | 1.40 | 1.40 | 1.39 | 1.32 | 1.34 |
| —$C_2H_4O$— units from PET[1] | 0.0% | 0.0% | 0.0% | 0.0% | 4.9% | 2.9% |
| —$C_2H_4O$— units from PES[1] | 7.7% | 7.7% | 7.7% | 7.7% | 7.7% | 7.7% |
| Total —$C_2H_4O$— units in foam-forming composition[2] | 3.6% | 3.6% | 3.6% | 3.6% | 5.9% | 4.9% |

RESULTS

| | | | | | | |
|---|---|---|---|---|---|---|
| Cream Time (sec) | 5 | 5 | 4 | 4 | 4 | 4 |
| Gel Time (sec) | 48 | 48 | 44 | 45 | 47 | 38 |
| Tack Free Time (sec) | 54 | 54 | 55 | 60 | 55 | 48 |
| Free Rise Density (pcf) | 1.80 | 1.78 | 1.79 | 1.86 | 1.85 | 1.67 |
| K-factor @35° F. (((BTU*in)/(h*ft2*° F.)) | 0.135 | 0.144 | 0.133 | 0.128 | 0.125 | 0.128 |
| K-factor @75° F. (((BTU*in)/(h*ft2*° F.)) | 0.148 | 0.155 | 0.144 | 0.138 | 0.136 | 0.136 |
| Closed Cell Content (%) | 85.1 | 82.3 | 81.7 | 87.3 | 87.2 | 90.2 |
| Compressive Strength + (psi) | 18.1 | 15.1 | 16.8 | 18.6 | 16.9 | 25.4 |
| Compressive Strength = (psi) | 29.3 | 14.8* | 29.6 | 15.7* | 32.4 | 43.4 |
| Dimensional Stability −30° C. @ 1 day (%) | −0.3 | 0.1 | 0.2 | 0.3 | −0.4 | −.5 |
| Dimensional Stability −30° C. @ 7 days (%) | 0.4 | 0.5 | −0.6 | −0.4 | −0.4 | 0.0 |
| Dimensional Stability 70° C. @ 1 day (%) | −0.5 | 0.3 | −0.3 | −0.2 | −0.5 | −1.3 |
| Dimensional Stability 70° C. @ 1 day (%) | 0.4 | 1.3 | 0.3 | −0.6 | −0.9 | −0.3 |
| Swell (in) | 0.130 | 0.063 | 0.166 | 0.221 | 0.144 | 0.082 |

Flow

| | | | | | | |
|---|---|---|---|---|---|---|
| Max Pressure (hPa) | 112 | 115 | 95 | 133 | 166 | 121 |
| Final Height (cm) | 97 | 97 | 94 | 99 | 98 | 99 |
| Max Rise Time (s) | 17 | 17 | 13 | 14 | 17 | 14 |
| Max Rise Rate (cm/s) | 2.7 | 2.7 | 2.7 | 2.9 | 2.5 | 3.1 |

| Material | Ex. 13 | Ex. 14 | Ex. 15 |
|---|---|---|---|
| POLYOL 1 | — | — | — |
| POLYOL 2 | 27.60 | 30.91 | 37.60 |
| POLYOL 3 | — | 20.69 | — |
| POLYOL 4 | 14.00 | — | 14.00 |
| POLYOL 5 | 10.00 | — | — |
| POLYOL 6 | 17.17 | 17.17 | 17.17 |
| SURFACTANT 1 | 2.71 | — | 2.71 |
| SURFACTANT 2 | — | — | — |
| SURFACTANT 3 | — | — | — |

TABLE 1-continued

| | | | |
|---|---|---|---|
| SURFACTANT 4 | — | 2.71 | — |
| SURFACTANT 5 | — | — | — |
| CATALYST 1 | 0.84 | 0.84 | 0.84 |
| CATALYST 2 | 0.84 | 0.84 | 0.84 |
| Water | 1.59 | 1.59 | 1.75 |
| BLOWING AGENT 1 | — | — | — |
| BLOWING AGENT 2 | 25.25 | 25.25 | 23.70 |
| INDEX | 1.24 | 1.39 | 1.27 |
| —$C_2H_4O$— units in PET[1] | 0.0% | 2.9% | 9.6% |
| —$C_2H_4O$— units in PES[1] | 7.7% | 7.7% | 8.2% |
| Total —$C_2H_4O$— units in foam-forming composition[2] | 4.9% | 5.0% | 8.3% |
| RESULTS | | | |
| Cream Time (sec) | 5 | 5 | 5 |
| Gel Time (sec) | 42 | 41 | 36 |
| Tack Free Time (sec) | 51 | 50 | 44 |
| Free Rise Density (pcf) | 1.65 | 1.81 | 1.79 |
| K-factor @35° F. (((BTU*in)/(h*ft2*° F.)) | 0.131 | 0.127 | 0.130 |
| K-factor @75° F. (((BTU*in)/(h*ft2*° F.)) | 0.142 | 0.136 | 0.141 |
| Closed Cell Content (%) | 87.5 | 88.8 | 88.0 |
| Compressive Strength + (psi) | 20.7 | 20.8 | 17.7 |
| Compressive Strength = (psi) | 37.6 | 35.1 | 34.5 |
| Dimensional Stability −30° C. @ 1 day (%) | −0.9 | −0.3 | −0.3 |
| Dimensional Stability −30° C. @ 7 days (%) | 0.1 | −0.7 | −0.7 |
| Dimensional Stability 70° C. @ 1 day (%) | −1.1 | −0.9 | −0.6 |
| Dimensional Stability 70° C. @ 1 day (%) | −0.1 | −0.8 | −0.1 |
| Swell (in) | 0.079 | 0.157 | 0.034 |
| Flow | | | |
| Max Pressure (hPa) | 120 | 101 | 131 |
| Final Height (cm) | 104 | 93 | 98 |
| Max Rise Time (s) | 15 | 14 | 14 |
| Max Rise Rate (cm/s) | 2.9 | 2.9 | 3.0 |

*It is believed that duplicate "perpendicular flow" samples were evaluated and these results do not represent the true compressive strength that "parallel flow" samples would afford.
[1]Reported value is based on total weight of polyol
[2]Reported value is based on total weight of the foam-forming composition

Examples 17-21

Foam-forming compositions were prepared using the ingredients and amounts (in parts by weight) set forth in Table 2. The materials used were as is described above.

Figure 2:
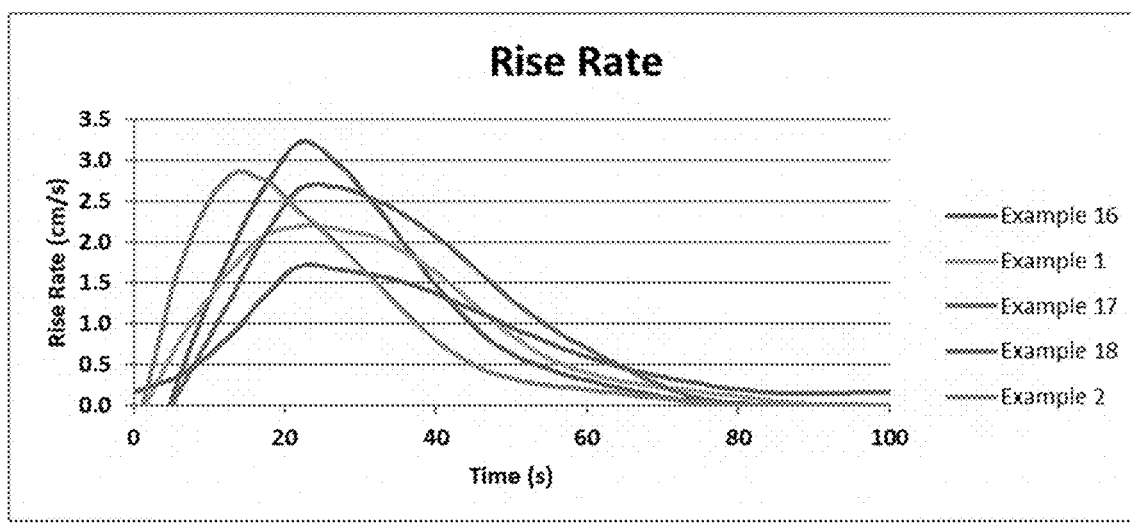

Foams were also prepared using a HK-100 high-pressure foam machine. The liquid output was maintained at a constant 21° C. for the Resin and 27° C. for the Isocyanate side with an output range of 454 grams/second. Foam was shot into a 79"×8"×2" (200×20×5 cm) mold between heated platens with a target overpack of 10% based on minimum fill density. The platens were maintained at 49° C. The foam remained in the mold and was allowed to cure for 10 minutes at 49° C. before removing. A 8"×8'×1" section of foam was sampled from the panels and used for k-factor testing according to ASTM C518. Lid opening swell was determined by foaming the aforementioned mold at an overpack level of 10% and allowing the part to demold for 2 minutes. After 2 minutes, the lid clamps were removed and the lid allowed to open based on the degree of foam swelling. The degree of swelling was measured at 30 seconds, 180 seconds, and 300 seconds after the lid clamps were removed. Jumbo tool demold was determined by foaming a 70 cm×40 cm×9 cm closed mold via a shot port at a mold temperature of 45° C. with an amount of foam to achieve a foam density of either 2.10 or 2.30 pcf. After the foam was dispensed, the shot port was closed with a cork and the foam allowed to cure for the specified amount of time (2, 3, or 4 minutes). After the specified demold time, the mold lid was opened and the part removed and allowed to rest overnight. After 24 hours, the thickness of the part was measured at the center-most point to determine the degree of foam swelling. Flow was evaluated as described above. Results are in Table 2. Rise rate profiles are displayed in FIG. 2. As is apparent, increased early flow was observed in the Example utilizing BLOWING AGENT 2 as well as reaching the max rise rate earlier in foaming process.

TABLE 2

| Material | Ex. 16 | Ex. 17 | Ex. 18 | Ex. 19 | Ex. 20 |
|---|---|---|---|---|---|
| POLYOL 1 | 33.04 | 30.91 | 31.36 | 28.81 | — |
| POLYOL 2 | — | — | — | — | 30.91 |
| POLYOL 3 | 22.12 | 20.69 | — | — | 20.69 |
| POLYOL 4 | — | — | 27.80 | 25.54 | — |
| POLYOL 5 | — | — | — | — | — |
| POLYOL 6 | 18.36 | 17.17 | 10.41 | 9.56 | 17.17 |
| SURFACTANT 1 | 2.90 | 2.71 | 2.86 | 2.63 | 2.71 |
| SURFACTANT 2 | — | — | — | — | — |
| SURFACTANT 3 | — | — | — | — | — |
| SURFACTANT 4 | — | — | — | — | — |

TABLE 2-continued

| Material | Ex. 16 | Ex. 17 | Ex. 18 | Ex. 19 | Ex. 20 |
|---|---|---|---|---|---|
| SURFACTANT 5 | — | — | — | — | — |
| CATALYST 1 | 0.90 | 0.84 | 0.87 | 0.80 | 0.84 |
| CATALYST 2 | 0.90 | 0.84 | 0.87 | 0.80 | 0.84 |
| Water | 1.70 | 1.59 | 1.38 | 1.27 | 1.59 |
| BLOWING AGENT 1 | 20.08 | — | 24.45 | — | — |
| BLOWING AGENT 2 | — | 25.25 | — | 30.59 | 25.25 |
| INDEX | 1.32 | 1.41 | 1.34 | 1.46 | 1.40 |
| —CHO— units from PET[1] | 9.6% | 9.0% | 14.9% | 13.6% | 0.0% |
| —$C_2H_4O$— units from PES[1] | 8.2% | 7.7% | 4.7% | 4.3% | 7.7% |
| Total —$C_2H_4O$— units in foam-forming composition[2] | 8.3% | 7.8% | 9.0% | 8.3% | 3.6% |
| RESULTS |  |  |  |  |  |
| Cream Time (sec) | Froth | Froth | Froth | Froth | Froth |
| Gel Time (sec) | 35 | 40 | 37 | 34 | 35 |
| Free Rise Density (pcf) | 1.21 | 1.37 | 1.42 | 1.43 | 1.31 |
| Bosch Min. Fill Density (pcf) | 2.02 | 2.00 | 1.99 | 2.02 | 2.01 |
| Packed Density (pcf) | 2.22 | 2.20 | 2.18 | 2.23 | 2.21 |
| Core Density (pcf) | 1.90 | 1.93 | 1.88 | 1.94 | 1.97 |
| Flow Index** | 1.67 | 1.46 | 1.40 | 1.41 | 1.53 |
| Overall vs. Core Density Ratio | 1.17 | 1.14 | 1.16 | 1.15 | 1.12 |
| K-factor @35° F. (((BTU*in)/(h*ft2*° F.)) | 0.118 | 0.120 | 0.116 | 0.125 | 0.119 |
| K-factor @75° F. (((BTU*in)/(h*ft2*° F.)) | 0.133 | 0.133 | 0.131 | 0.133 | 0.129 |
| Closed Cell Content (%) | 91.8 | 90.9 | 90.6 | 90.0 | 88.5 |
| Compressive Strength + (psi) | 21.4 | 22.3 | 18.9 | 21.0 | 22.9 |
| Compressive Strength = (psi) | 35.1 | 33.8 | 31.2 | 23.6 | 36.4 |
| Dimensional Stability −30° C. @ 1 day (%) | 0.0 | 0.0 | −0.2 | −0.1 | −0.4 |
| Dimensional Stability −30° C. @ 7 days (%) | −0.1 | −0.1 | −0.1 | −0.3 | −0.5 |
| Dimensional Stability 70° C. @ 1 day (%) | −0.8 | −0.8 | −1.1 | −0.6 | −1.1 |
| Dimensional Stability 70° C. @ 1 day (%) | −0.8 | −0.1 | −0.4 | 0.2 | −0.5 |
| Lid Opening Swell @ 0.5 min (in); 10% OP | 0.320 | 0.204 | 0.231 | 0.096 | 0.144 |
| Lid Opening Swell @ 3 min (in); 10% OP | 0.287 | 0.185 | 0.223 | 0.088 | 0.126 |
| Lid Opening Swell @ 5 min (in); 10% OP | 0.278 | 0.173 | 0.212 | 0.081 | 0.120 |
| Jumbo Tool Swell: 2.10 pcf @ 2 min (mm) | 15.4 | 11.6 | 6.3 | 10.3 | 6.8 |
| Jumbo Tool Swell: 2.10 pcf @ 3 min (mm) | 13.2 | 9.1 | 3.1 | 9.2 | 5.1 |
| Jumbo Tool Swell: 2.10 pcf @ 4 min (mm) | 9.7 | 6.2 | 3.2 | 9.2 | 3.0 |
| Jumbo Tool Swell: 2.30 pcf @ 2 min (mm) | 20.5 | 19.2 | 7.5 | 11.5 | 8.8 |
| Jumbo Tool Swell: 2.30 pcf @ 3 min (mm) | 18.6 | 16.0 | 5.5 | 9.8 | 7.6 |
| Jumbo Tool Swell: 2.30 pcf @ 4 min (mm) | 13.3 | 16.3 | 6.5 | 9.1 | 7.0 |

**Flow index is the Bosch minimum fill density divided by the free rise density.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A polyurethane foam-forming composition comprising:
   (a) a polyisocyanate;
   (b) a polyol blend comprising an aromatic amine-initiated polyether polyol having an OH number of at least 200 mg KOH/g and a functionality of at least 3, wherein
      (i) the aromatic amine-initiated polyether polyol having an OH number of at least 200 mg KOH/g is present in amount of at least 20% by weight, based on total weight of polyol, and
      (ii) the polyol blend has a content of —$C_2H_4O$— units of 2 to 7% by weight, based on total weight of the polyurethane foam-forming composition; and
   (c) a physical blowing agent composition comprising:
      (i) cis-1,1,1,4,4,4-hexafluoro-2-butene, and
      (ii) trans-1,1,1,4,4,4-hexafluoro-2-butene,
   wherein the sum of the amount of cis-1,1,1,4,4,4-hexafluoro-2-butene and trans-1,1,1,4,4,4-hexafluoro-2-butene represents at least 90% by weight, based on the total weight of the physical blowing agent composition.

2. The polyurethane foam-forming composition of claim 1, wherein the aromatic amine-initiated polyether polyol comprises a reaction product of an H-functional starter comprising an aromatic amine with an alkylene oxide, wherein
   (i) the aromatic amine comprises toluenediamine present in an amount of more than 50% by weight, based on total weight of H-functional starter, and
   (ii) the alkylene oxide comprises propylene oxide in an amount of at least 90% by weight, based on total weight of alkylene oxide, and wherein the aromatic amine-initiated polyether polyol has an OH number of 200 to 405 mg KOH/g and a functionality of 3.5 to 4.5.

3. The polyurethane foam-forming composition of claim 2, wherein the aromatic amine-initiated polyether polyol is present in the polyol blend in an amount of 40 to 60% by weight, based on total weight of polyol in the polyol blend.

4. The polyurethane foam-forming composition of claim 1, wherein the polyol blend has a content of —$C_2H_4O$— units of 3 to 6% by weight, based on total weight of the polyurethane foam-forming composition.

5. The polyurethane foam-forming composition of claim 1, wherein the content of —$C_2H_4O$— units of polyether polyol in the polyol blend is no more than 5% by weight, based on total weight of polyol.

6. The polyurethane foam-forming composition of claim 1, wherein the physical blowing agent composition is present in an amount of 10 to 30% by weight, based on total weight of the polyurethane foam-forming composition except for the weight of the polyisocyanate.

7. The polyurethane foam-forming composition of claim 6, further comprising a carbon dioxide generating chemical blowing agent present in an amount of 1.5 to 4% by weight, based on total weight of the polyurethane foam-forming composition except for the weight of the polyisocyanate.

8. A process for producing rigid polyurethane foam comprising mixing the polyurethane foam-forming composition of claim 1 at an isocyanate index of 0.90 to 1.50, wherein the rigid polyurethane foam has a closed-cell content of more than 85 percent, as measured according to ASTM D6226-15.

9. A method of producing a polyurethane foam, comprising reacting a polyol blend with a polyisocyanate at an isocyanate index of 0.70 to 1.50 in the presence of components comprising a physical blowing agent composition, wherein:
(1) the polyol blend comprises an aromatic amine-initiated polyether polyol having an OH number of at least 200 mg KOH/g and a functionality of at least 3 that is present in amount of at least 20% by weight, based on total weight of polyol,
(2) the polyol blend has a content of —$C_2H_4O$— units of 2 to 7% by weight, based on total weight of the polyurethane foam; and
(3) the blowing agent composition comprises cis-1,1,1,4,4,4-hexafluoro-2-butene and trans-1,1,1,4,4,4-hexafluoro-2-butene, wherein the sum of the amount of cis-1,1,1,4,4,4-hexafluoro-2-butene and trans-1,1,1,4,4,4-hexafluoro-2-butene represents at least 90% by weight, based on the total weight of the physical blowing agent composition.

10. An isocyanate-reactive composition comprising:
(a) a polyol blend comprising an aromatic amine-initiated polyether polyol having an OH number of at least 200 mg KOH/g and a functionality of at least 3, wherein
(i) the aromatic amine-initiated polyether polyol having an OH number of at least 200 mg KOH/g is present in amount of at least 20% by weight, based on total weight of polyol, and
(ii) the polyol blend has a content of —$C_2H_4O$— units of 4 to 15% by weight, based on total weight of the isocyanate-reactive composition; and
(b) a physical blowing agent composition comprising:
(i) cis-1,1,1,4,4,4-hexafluoro-2-butene, and
(ii) trans-1,1,1,4,4,4-hexafluoro-2-butene,
wherein the sum of the amount of cis-1,1,1,4,4,4-hexafluoro-2-butene and trans-1,1,1,4,4,4-hexafluoro-2-butene represents at least 90% by weight, based on the total weight of the physical blowing agent composition.

11. The polyurethane foam-forming composition of claim 1, wherein the polyol blend comprises a saccharide-initiated polyether polyol that is a reaction product of an H-functional starter comprising saccharide with alkylene oxide, wherein:
(i) the saccharide comprises sucrose present in an amount of more than 50% by weight, based on total weight of the H-functional starter used to produce the saccharide-initiated polyether polyol and wherein the H-functional starter further comprises water, propylene glycol, ethylene glycol, ethanol amine, diethylene glycol, or a mixture of any two or more thereof, and
(ii) the saccharide-initiated polyether polyol has an OH number of 200 to 600 mg KOH/g and a functionality of 4 to 6.

12. The polyurethane foam-forming composition of claim 11, wherein the saccharide-initiated polyether polyol is present in an amount of 10 to 50% by weight, based on total weight of polyol in the polyol blend.

13. The polyurethane foam-forming composition of claim 12, wherein the polyol blend further comprises an aromatic polyester polyol having an OH number of 150 to 410 mg KOH/g and a functionality of 1.5 to 3, wherein the aromatic polyester polyol is present in an amount of 5 to 40% by weight, based upon total weight of the polyol blend.

14. The polyurethane foam-forming composition of claim 11, wherein the aromatic amine-initiated polyether polyol and the saccharide-initiated polyether polyol are present in the polyol blend is a weight ratio of 1:1 to 5:1 and the aromatic amine-initiated polyether polyol and the aromatic polyester polyol are present in the polyol blend in a weight ratio of 1:1 to 5:1.

15. The polyurethane foam-forming composition of claim 11, wherein the alkylene oxide used to produce the saccharide-initiated polyether polyol comprises propylene oxide and ethylene oxide, wherein propylene oxide is used in an amount of more than 50% by weight, based on total weight of alkylene oxide used to prepare the saccharide-initiated polyether polyol.

16. The polyurethane foam-forming composition of claim 1, wherein the cis-1,1,1,4,4,4-hexafluoro-2-butene and the trans-1,1,1,4,4,4-hexafluoro-2-butene are present in the physical blowing agent composition in a relative ratio, by weight, of greater than 1 part of cis-1,1,1,4,4,4-hexafluoro-2-butene per 1 part of trans-1,1,1,4,4,4-hexafluoro-2-butene.

17. The method of claim 9, wherein the polyol blend comprises a saccharide-initiated polyether polyol that is a reaction product of an H-functional starter comprising saccharide with alkylene oxide, wherein:
(i) the saccharide comprises sucrose present in an amount of more than 50% by weight, based on total weight of the H-functional starter used to produce the saccharide-initiated polyether polyol and wherein the H-functional starter further comprises water, propylene glycol, ethylene glycol, ethanol amine, diethylene glycol, or a mixture of any two or more thereof, and
(ii) the saccharide-initiated polyether polyol has an OH number of 200 to 600 mg KOH/g and a functionality of 4 to 6.

18. The method of claim 17, wherein the alkylene oxide used to produce the saccharide-initiated polyether polyol comprises propylene oxide and ethylene oxide, wherein propylene oxide is used in an amount of more than 50% by weight, based on total weight of alkylene oxide used to prepare the saccharide-initiated polyether polyol.

19. The method of claim 9, wherein the cis-1,1,1,4,4,4-hexafluoro-2-butene and the trans-1,1,1,4,4,4-hexafluoro-2-butene are present in the physical blowing agent composition in a relative ratio, by weight, of greater than 1 part of cis-1,1,1,4,4,4-hexafluoro-2-butene per 1 part of trans-1,1,1,4,4,4-hexafluoro-2-butene.

20. The isocyanate-reactive composition of claim 10, wherein the polyol blend comprises a saccharide-initiated polyether polyol that is a reaction product of an H-functional starter comprising saccharide with alkylene oxide, wherein:
   (i) the saccharide comprises sucrose present in an amount of more than 50% by weight, based on total weight of the H-functional starter used to produce the saccharide-initiated polyether polyol and wherein the H-functional starter further comprises water, propylene glycol, ethylene glycol, ethanol amine, diethylene glycol, or a mixture of any two or more thereof, and
   (ii) the saccharide-initiated polyether polyol has an OH number of 200 to 600 mg KOH/g and a functionality of 4 to 6.

21. The isocyanate-reactive composition of claim 20, wherein the alkylene oxide used to produce the saccharide-initiated polyether polyol comprises propylene oxide and ethylene oxide, wherein propylene oxide is used in an amount of more than 50% by weight, based on total weight of alkylene oxide used to prepare the saccharide-initiated polyether polyol.

22. The isocyanate-reactive composition of claim 10, wherein the cis-1,1,1,4,4,4-hexafluoro-2-butene and the trans-1,1,1,4,4,4-hexafluoro-2-butene are present in the physical blowing agent composition in a relative ratio, by weight, of greater than 1 part of cis-1,1,1,4,4,4-hexafluoro-2-butene per 1 part of trans-1,1,1,4,4,4-hexafluoro-2-butene.

\* \* \* \* \*